United States Patent
Tange et al.

(10) Patent No.: US 12,551,445 B2
(45) Date of Patent: Feb. 17, 2026

(54) LIPID NANOPARTICLE LYOPHILIZED COMPOSITION

(71) Applicants: NOF CORPORATION, Tokyo (JP); NATIONAL UNIVERSITY CORPORATION CHIBA UNIVERSITY, Chiba (JP)

(72) Inventors: Kota Tange, Kawasaki (JP); Yuta Nakai, Kawasaki (JP); Shinya Tamagawa, Kawasaki (JP); Sakura Taneichi, Kawasaki (JP); Hidetaka Akita, Chiba (JP); Hiroki Tanaka, Chiba (JP); Daiki Shirane, Chiba (JP); Shinya Hagiwara, Chiba (JP)

(73) Assignees: NOF CORPORATION, Tokyo (JP); NATIONAL UNIVERSITY CORPORATION CHIBA UNIVERSITY, Chiba (JP)

(*) Notice: Subject to any disclaimer, the term of this patent is extended or adjusted under 35 U.S.C. 154(b) by 0 days.

(21) Appl. No.: 17/762,259

(22) PCT Filed: Sep. 25, 2020

(86) PCT No.: PCT/JP2020/036196
§ 371 (c)(1),
(2) Date: Mar. 21, 2022

(87) PCT Pub. No.: WO2021/060440
PCT Pub. Date: Apr. 1, 2021

(65) Prior Publication Data
US 2022/0354793 A1     Nov. 10, 2022

(30) Foreign Application Priority Data

Sep. 26, 2019  (JP) ................................ 2019-176253

(51) Int. Cl.
| A61K 9/19 | (2006.01) |
| A61K 47/10 | (2017.01) |
| A61K 47/24 | (2006.01) |
| A61K 47/28 | (2006.01) |
| A61K 47/44 | (2017.01) |
| A61K 47/69 | (2017.01) |

(52) U.S. Cl.
CPC ............... *A61K 9/19* (2013.01); *A61K 47/10* (2013.01); *A61K 47/24* (2013.01); *A61K 47/28* (2013.01); *A61K 47/44* (2013.01); *A61K 47/69* (2017.08)

(58) Field of Classification Search
CPC .......... A61K 9/19; A61K 47/10; A61K 47/24; A61K 47/28; A61K 47/44; A61K 47/69; A61K 9/0019; A61K 48/005; A61K 9/5123; A61K 31/7088; A61K 47/26; A61K 47/6929; A61K 48/0041; A61K 48/0008; A61K 48/0025; C12N 15/88; C12N 15/87
See application file for complete search history.

(56) References Cited

U.S. PATENT DOCUMENTS

| 6,124,270 | A | 9/2000 | Haensler |
| 8,895,717 | B2* | 11/2014 | Sood et al. ............ C07H 21/04 |
| | | | 536/24.5 |
| 2002/0142029 | A1 | 10/2002 | Porta et al. |
| 2006/0029655 | A1 | 2/2006 | Barenholz et al. |
| 2010/0055684 | A1* | 3/2010 | Kikuchi ............ A61K 48/0025 |
| | | | 435/6.16 |
| 2014/0335157 | A1 | 11/2014 | Tange et al. |
| 2018/0155304 | A1 | 6/2018 | Nakai et al. |
| 2021/0023008 | A1 | 1/2021 | Nakai et al. |

FOREIGN PATENT DOCUMENTS

| EP | 2718269 B1 | 1/2018 | |
| JP | H10-501822 A | 2/1998 | |
| JP | 2005-525992 A | 11/2005 | |
| JP | 4598908 B2 | 12/2010 | |
| JP | 2011-172519 A | 9/2011 | |
| JP | 4919397 B2 | 4/2012 | |
| JP | 6093710 B2 | 3/2017 | |
| JP | 2019-525901 A | 9/2019 | |
| WO | WO-2012170889 A1 * | 12/2012 | ............ A61K 31/708 |
| WO | WO 2013/073480 A1 | 5/2013 | |
| WO | WO 2016/121942 A1 | 8/2016 | |
| WO | WO-2017015552 A1 * | 1/2017 | ............ A61K 31/713 |
| WO | WO 2017/218704 A1 | 12/2017 | |
| WO | WO 2019/092280 A1 | 5/2019 | |
| WO | WO 2019/188867 A1 | 10/2019 | |

(Continued)

OTHER PUBLICATIONS

Leung et al. (Lipid Nanoparticles for Short Interfering RNA Delivery, Advances in Genetics, 2014 (Year: 2014).*
Fu et al., "Pharmaceutical Excipients," China Traditional Chinese Medicine Press, p. 111 (2008).
China National Intellectual Property Administration, Second Office Action in Chinese Patent Application No. 202080067324.0 (Sep. 9, 2023).
European Patent Office, Extended European Search Report in European Patent Application No. 20870125.0 (Oct. 2, 2023).
Shirane et al., "Development of an Alcohol Dilution-Lyophilization Method for Preparing Lipid Nanoparticles Containing Encapsulated siRNA," *Biol. Pharm. Bull.*, 41: 1291-1294 and Supplementary Materials (2018).
Wheeler et al., "Stabilized Plasmid-Lipid Particles: Construction and Characterization," *Gene Therapy*, 6(2): 271-281 (1999).

(Continued)

*Primary Examiner* — Robert A Wax
*Assistant Examiner* — John Seungjai Kwon
(74) *Attorney, Agent, or Firm* — Leydig, Voit & Mayer, Ltd.

(57) ABSTRACT

A lyophilized composition capable of encapsulating any nucleic acid with high efficiency and easily is provided. A lyophilized composition of lipid nanoparticles not containing a nucleic acid but containing an ionic lipid, a sterol, a PEG lipid, an acidic buffer component that shows a buffering action at pH 1-6, and a cryoprotectant, wherein a weight ratio of the cryoprotectant and a total lipid is 10:1-1000:1.

25 Claims, 10 Drawing Sheets

Specification includes a Sequence Listing.

(56) References Cited

FOREIGN PATENT DOCUMENTS

WO    WO-2021046265 A1 *  3/2021  ........... A61K 31/445

OTHER PUBLICATIONS

Japan Patent Office, International Search Report in International Patent Application No. PCT/JP2020/036196 (Dec. 1, 2020).
Japan Patent Office, Written Opinion of the International Searching Authority in International Patent Application No. PCT/JP2020/036196 (Dec. 1, 2020).
Li et al., "Single-Particle Spectroscopic Chromatography Reveals Heterogeneous RNA Loading and Size Correlations in Lipid Nanoparticles," ACS Nano, 18: 15729-15743 (2024).
Nakabayashi et al., "Analysis of Particle Formation Mechanism in Ready-to-Use Type Lipid Nanoparticle Formulations," The 40th Annual Meeting of the Japan Society of Drug Delivery System, Lecture Jp1-C-14 (Jul. 10, 2024).
Xia et al., "Effect of Surface Properties on Liposomal siRNA Delivery," Biomaterials, 79: 56-68 (2016).

* cited by examiner

[Fig. 1]
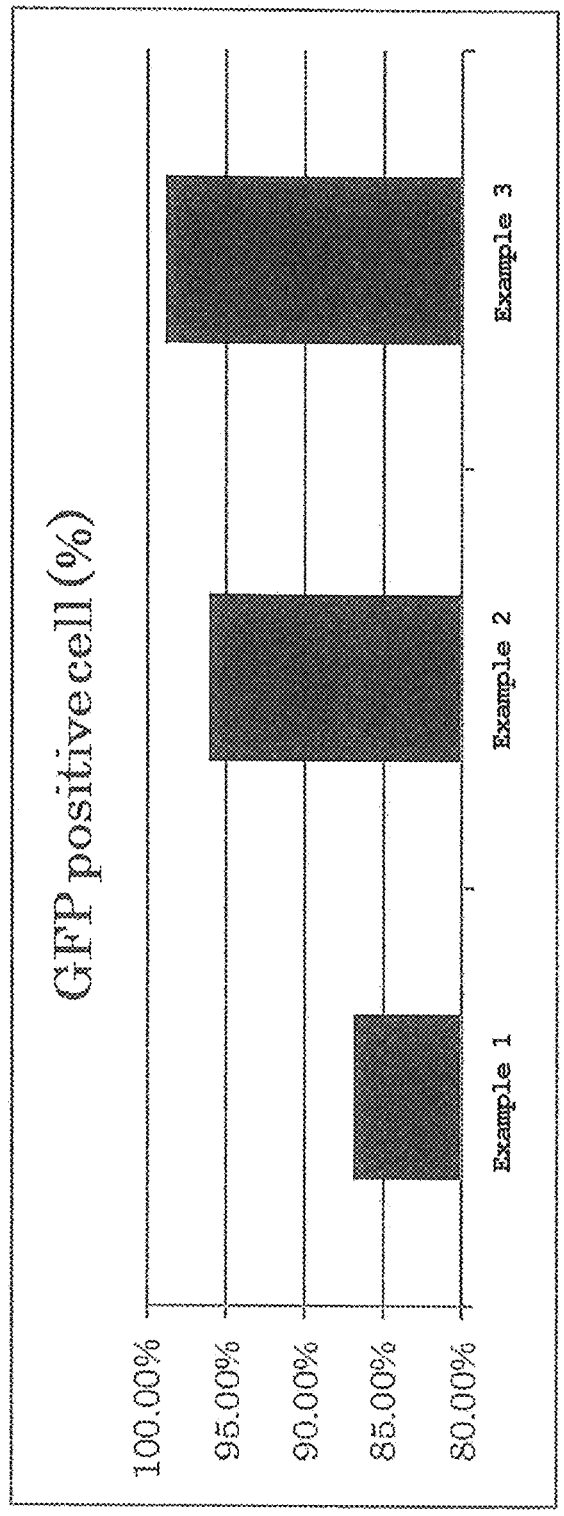

[Fig. 2]
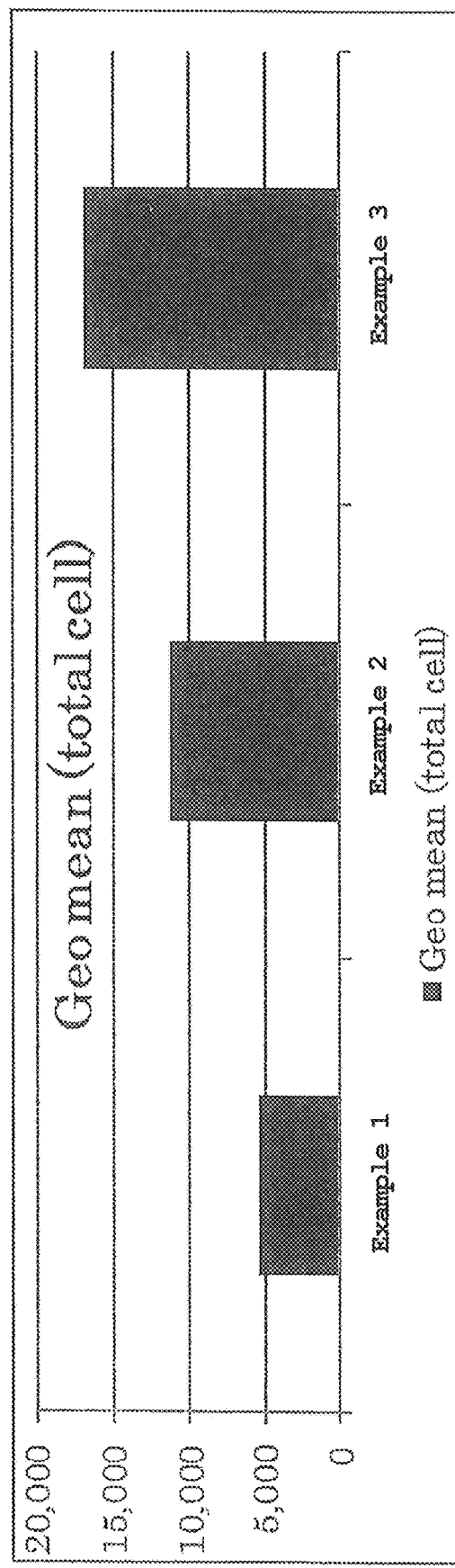

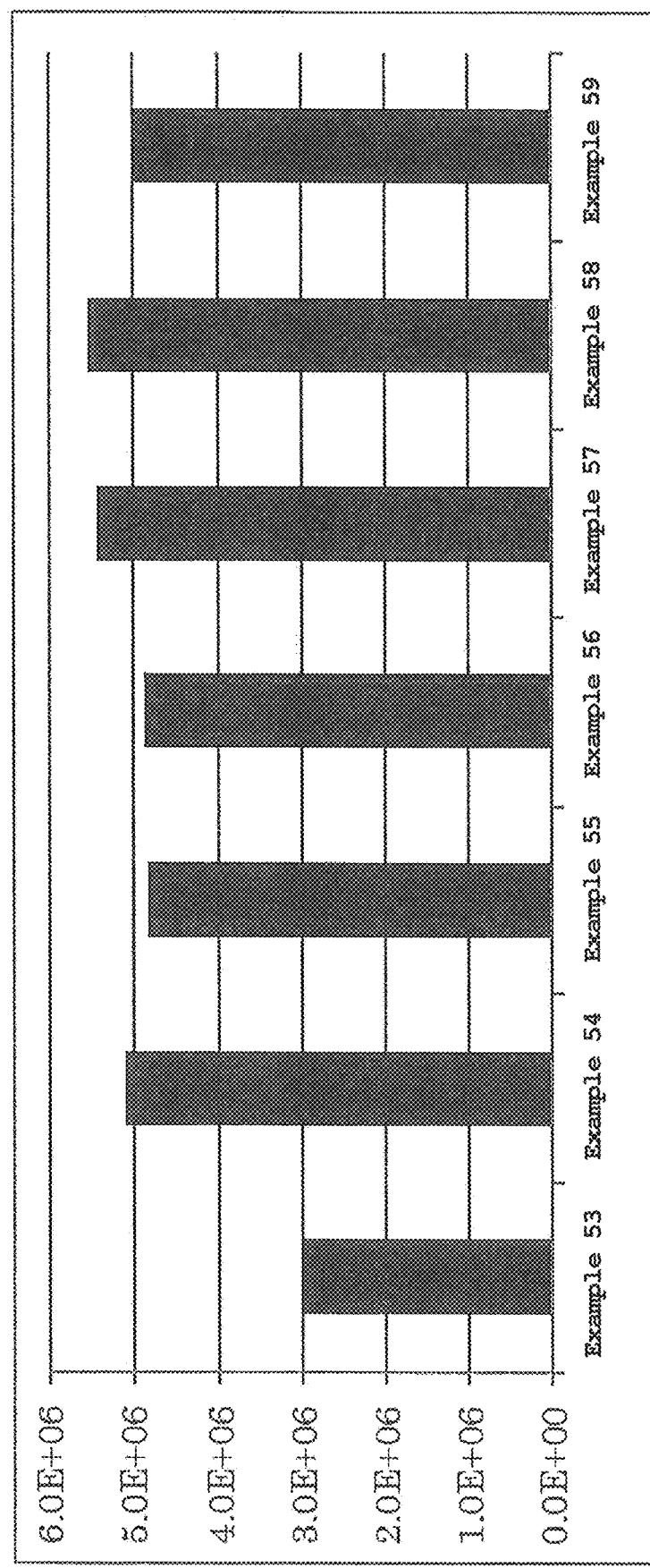
[Fig. 3]

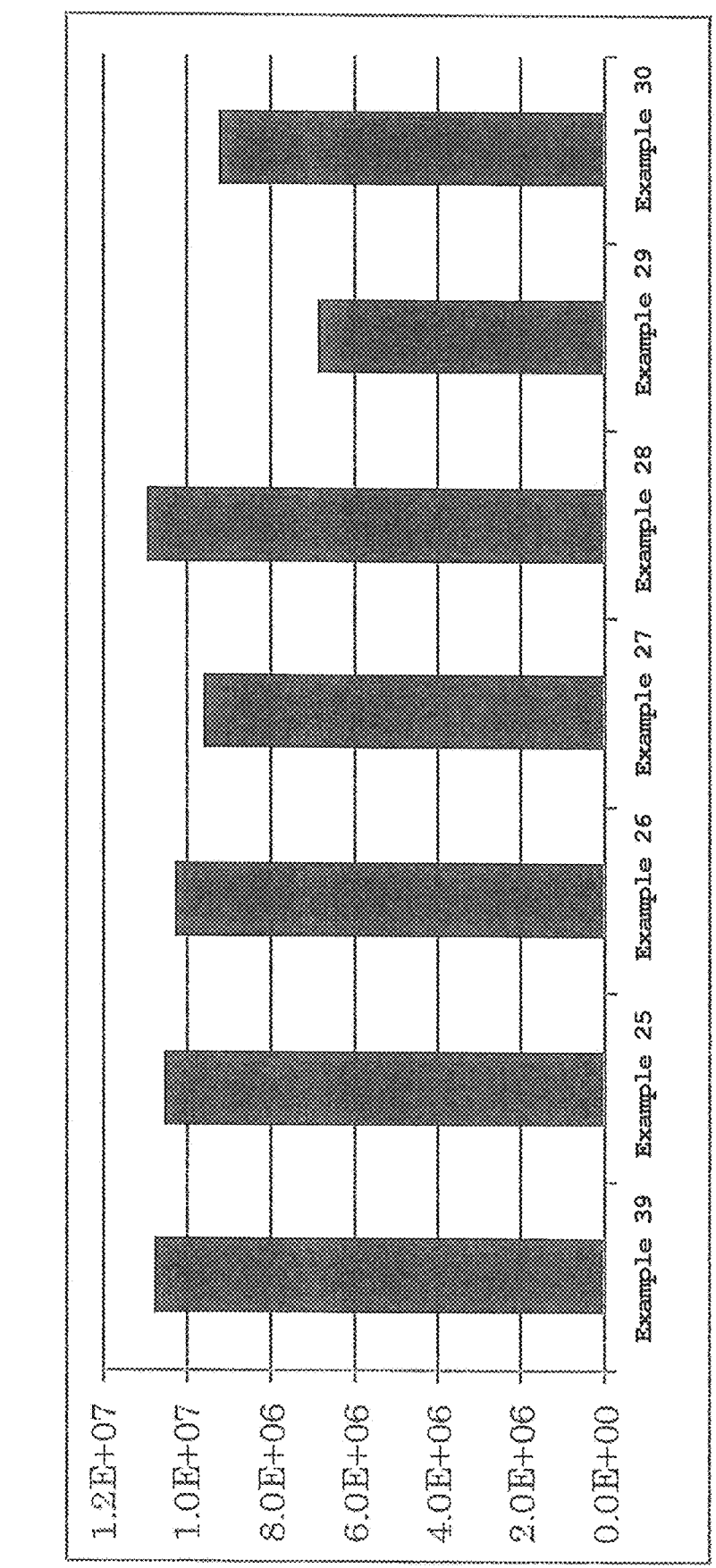
[Fig. 4]

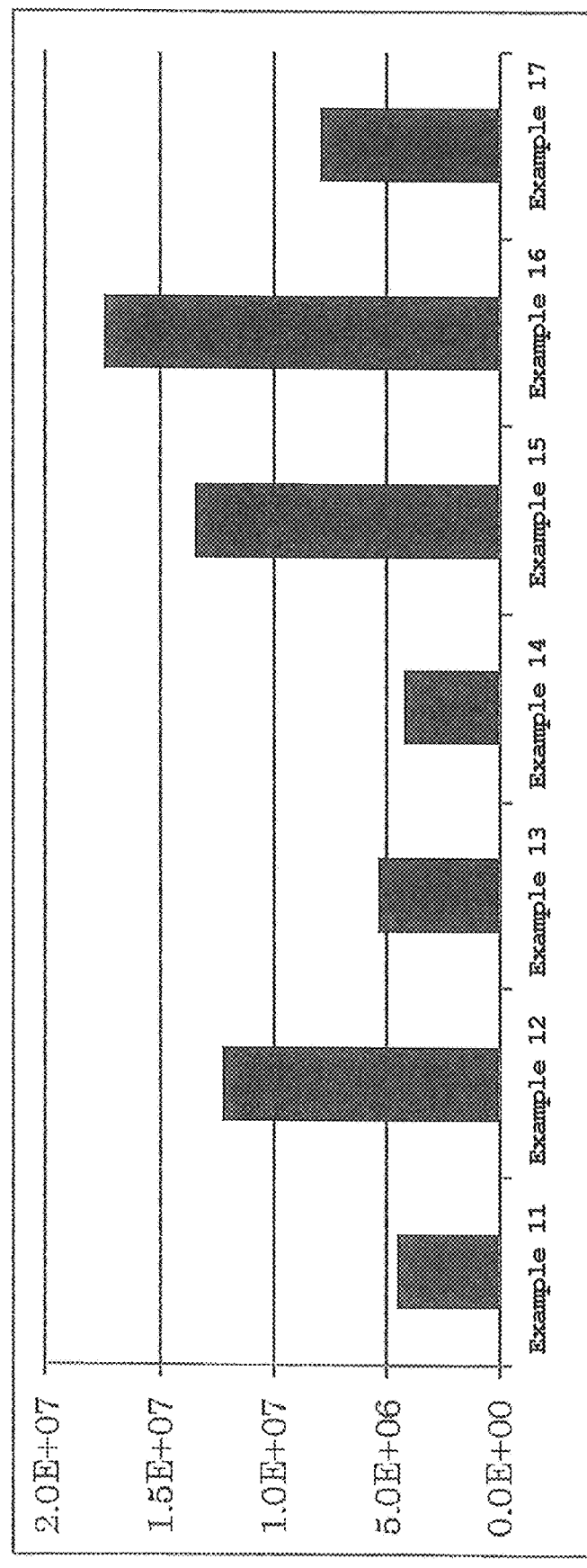
[Fig. 5]

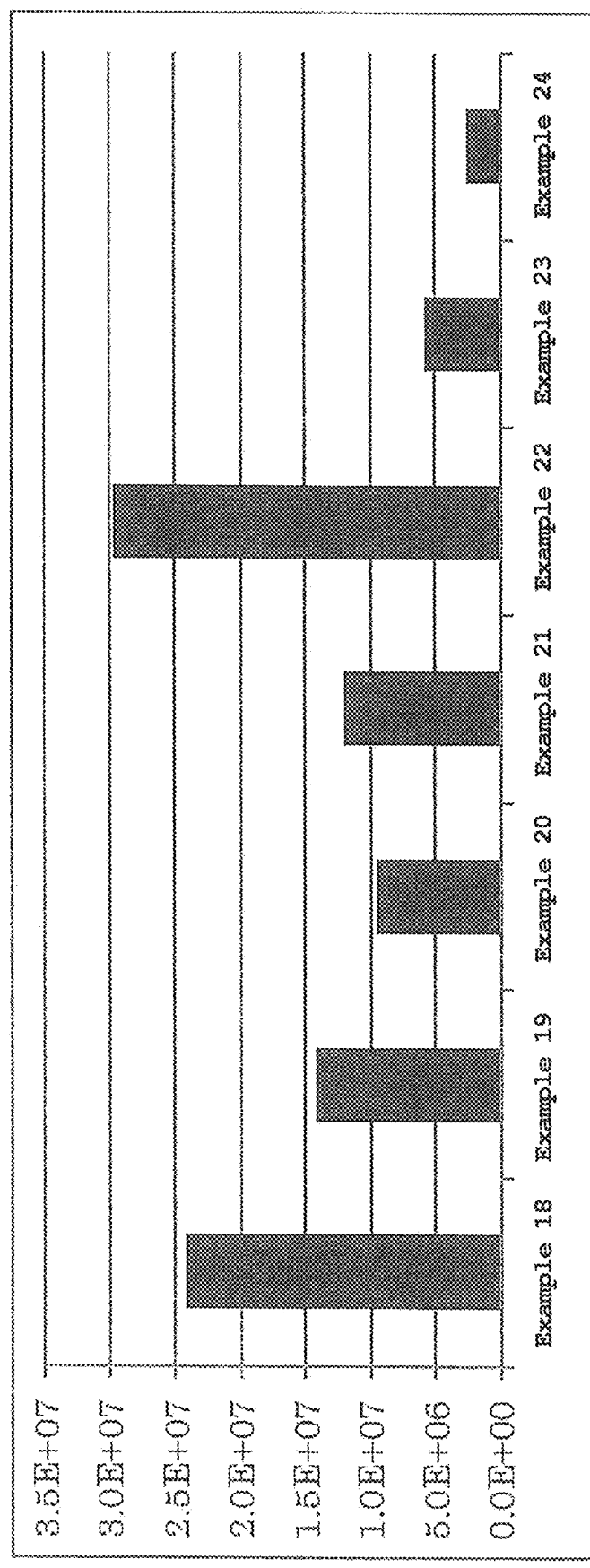
[Fig. 6]

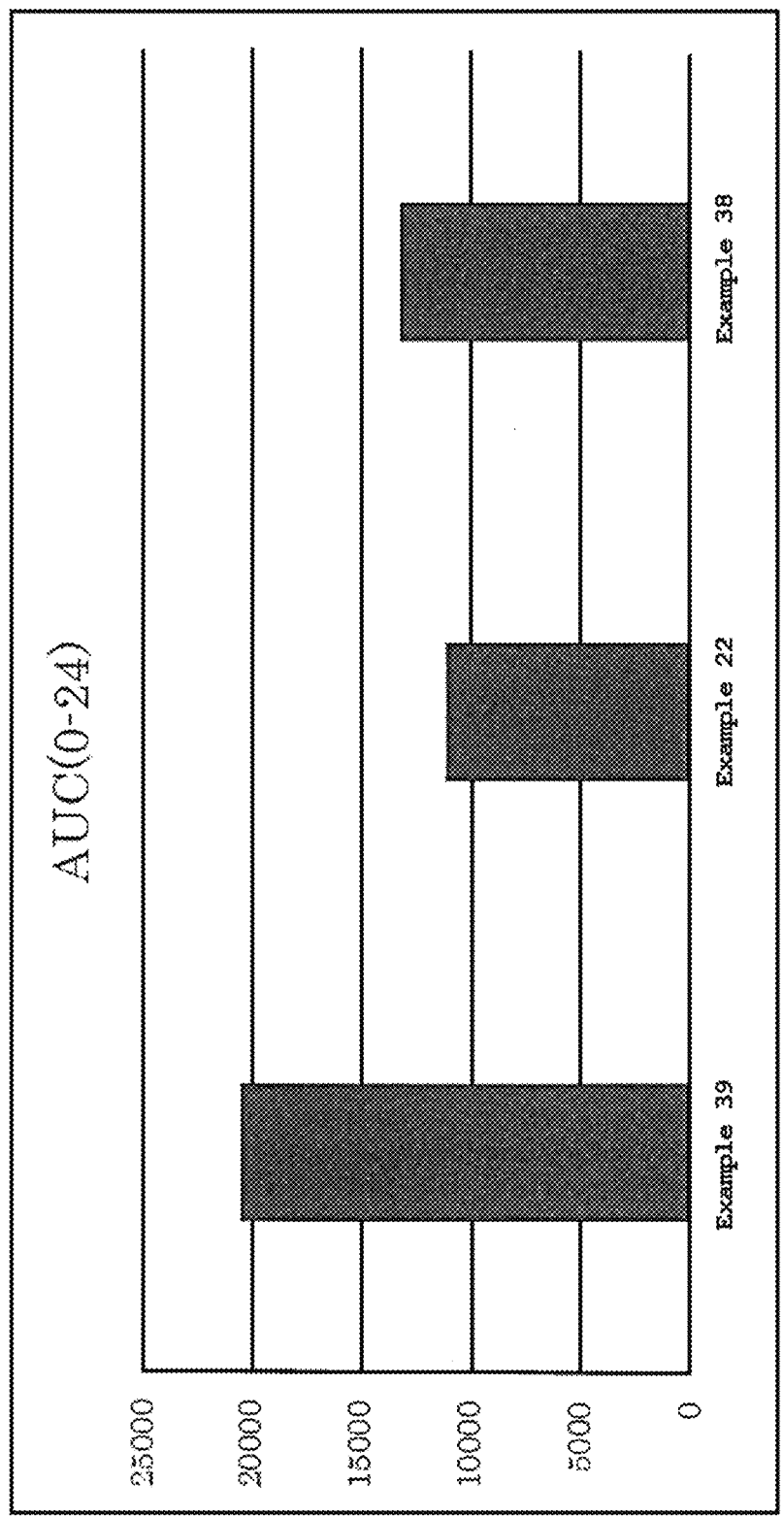
[Fig. 7]

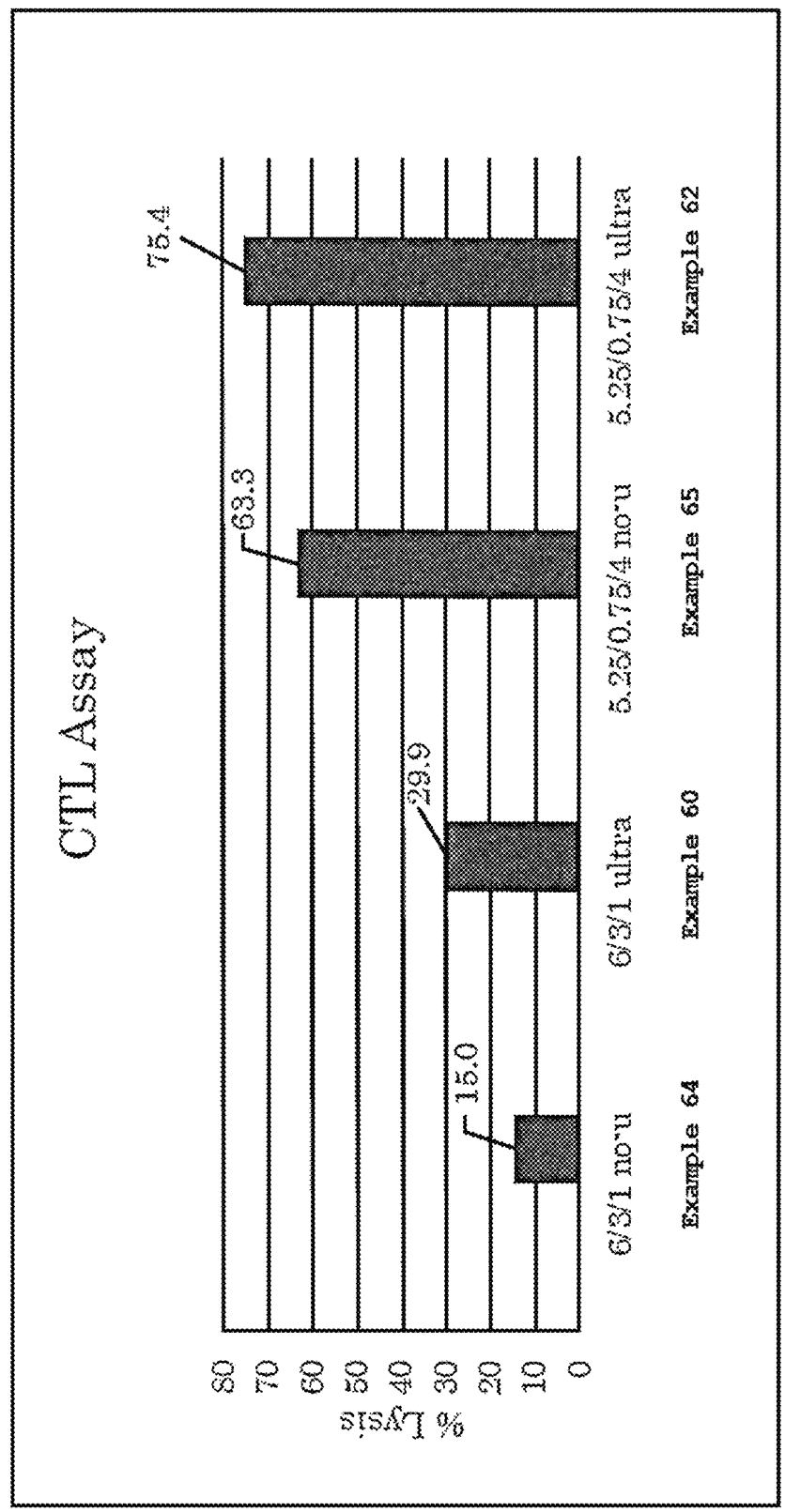
[Fig. 8]

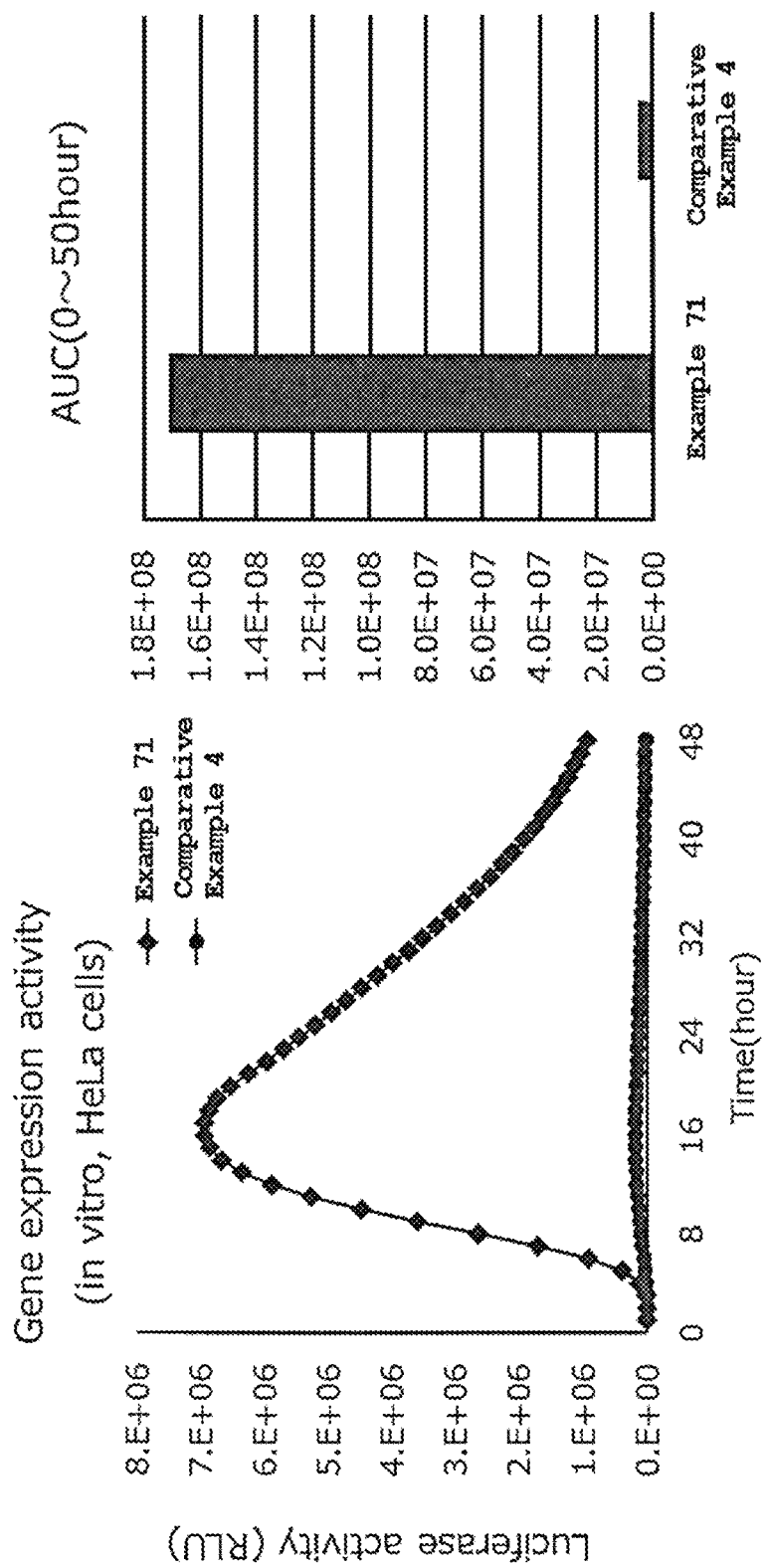
[Fig. 9]

[Fig. 10]
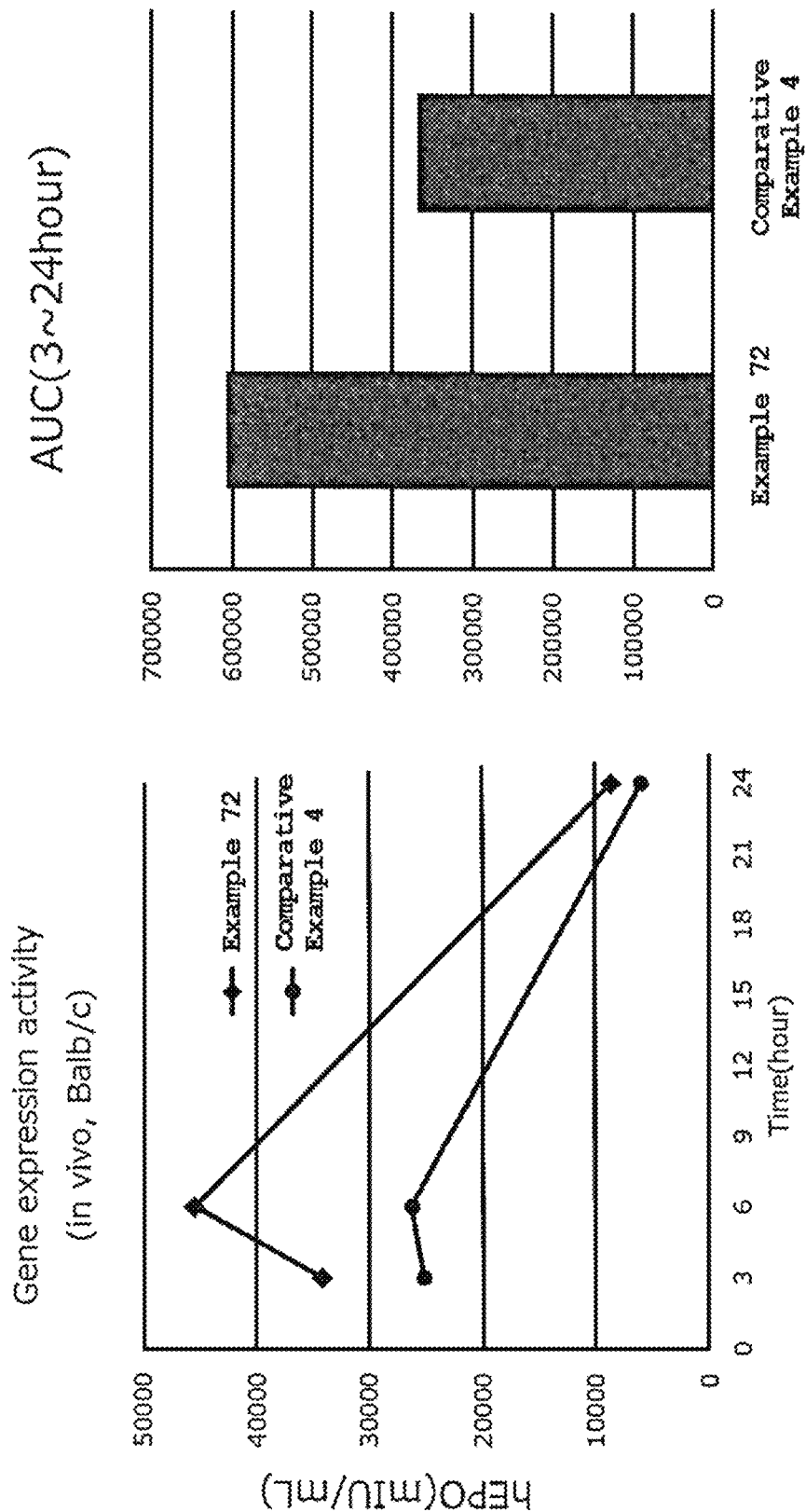

SEQUENCE LISTING

```
<160> NUMBER OF SEQ ID NOS: 3

<210> SEQ ID NO 1
<211> LENGTH: 21
<212> TYPE: RNA
<213> ORGANISM: Artificial Sequence
<220> FEATURE:
<223> OTHER INFORMATION: Synthetic Sequence - siRNA sense
<220> FEATURE:
<221> NAME/KEY: modified_base
<222> LOCATION: (4)..(5)
<223> OTHER INFORMATION: 2'-fluoro-modified nucleotide
<220> FEATURE:
<221> NAME/KEY: modified_base
<222> LOCATION: (7)..(10)
<223> OTHER INFORMATION: 2'-fluoro-modified nucleotide
<220> FEATURE:
<221> NAME/KEY: modified_base
<222> LOCATION: (14)..(17)
<223> OTHER INFORMATION: 2'-fluoro-modified nucleotide
```

```
<220> FEATURE:
<221> NAME/KEY: modified_base
<222> LOCATION: (19)..(19)
<223> OTHER INFORMATION: 2'-fluoro-modified nucleotide
<220> FEATURE:
<221> NAME/KEY: misc_feature
<222> LOCATION: (20)..(21)
<223> OTHER INFORMATION: n is deoxythymidine
<220> FEATURE:
<221> NAME/KEY: misc_feature
<222> LOCATION: (20)..(21)
<223> OTHER INFORMATION: phosphorothioate linkage

<400> SEQUENCE: 1
ggaucaucuc aagucuuacn n                                          21

<210> SEQ ID NO 2
<211> LENGTH: 21
<212> TYPE: RNA
<213> ORGANISM: Artificial Sequence
<220> FEATURE:
<223> OTHER INFORMATION: Synthetic Sequence - siRNA antisense
<220> FEATURE:
<221> NAME/KEY: modified_base
<222> LOCATION: (2)..(2)
<223> OTHER INFORMATION: 2'-fluoro-modified nucleotide
<220> FEATURE:
<221> NAME/KEY: modified_base
<222> LOCATION: (7)..(9)
<223> OTHER INFORMATION: 2'-fluoro-modified nucleotide
<220> FEATURE:
<221> NAME/KEY: modified_base
<222> LOCATION: (14)..(14)
<223> OTHER INFORMATION: 2'-fluoro-modified nucleotide
<220> FEATURE:
<221> NAME/KEY: modified_base
<222> LOCATION: (17)..(19)
<223> OTHER INFORMATION: 2'-fluoro-modified nucleotide
<220> FEATURE:
<221> NAME/KEY: misc_feature
<222> LOCATION: (20)..(21)
<223> OTHER INFORMATION: n is deoxythymidine
<220> FEATURE:
<221> NAME/KEY: misc_feature
<222> LOCATION: (20)..(21)
<223> OTHER INFORMATION: phosphorothioate linkage

<400> SEQUENCE: 2
guaagacuug agaugauccn n                                          21

<210> SEQ ID NO 3
<211> LENGTH: 8
<212> TYPE: PRT
<213> ORGANISM: Artificial Sequence
<220> FEATURE:
<223> OTHER INFORMATION: Synthetic Sequence - OVA peptide

<400> SEQUENCE: 3

Ser Ile Ile Asn Phe Glu Lys Leu
1               5
```

LIPID NANOPARTICLE LYOPHILIZED COMPOSITION

INCORPORATION-BY-REFERENCE OF MATERIAL ELECTRONICALLY SUBMITTED

Incorporated by reference in its entirety herein is a computer-readable nucleotide/amino acid sequence listing submitted concurrently herewith and identified as follows: 1,962 bytes ASCII (Text) file named "759873 SequenceListing.txt," created Mar. 18, 2022.

TECHNICAL FIELD

The present invention relates to a lyophilized composition of lipid nanoparticles not containing a nucleic acid and a method for producing nucleic acid-encapsulating lipid nanoparticles by using same.

BACKGROUND ART

For practicalization of nucleic acid therapy using oligonucleic acids such as siRNA, and gene therapy using mRNA, pDNA, and the like, an effective and safe nucleic acid delivery carrier is demanded. While virus vectors are nucleic acid delivery carriers with good expression efficiency, the development of non-viral nucleic acid delivery carriers that can be used more safely is ongoing.

Since cationic liposomes using cationic lipids with quaternary amine are positively charged, they can form a complex (lipoplex) by electrostatic interaction with negatively-charged nucleic acids, and can deliver nucleic acids into cells. Utilizing the electrostatic interaction of quaternary amine with nucleic acid, it is also possible to prepare a lyophilized composition of cationic liposomes not containing nucleic acids and form a lipoplex by rehydration with an aqueous solution of nucleic acid. Thus, it has been shown that use thereof as a gene transfer reagent is available (Patent Literatures 1 and 2).

However, it is difficult to control the particle size of lipoplex produced by such method, and cytotoxicity derived from positively-charged cationic lipids becomes a problem.

Therefore, lipid nanoparticles (LNP) using ionic lipids having a tertiary amine—which is positively charged under acidic conditions and has no electric charge under near neutral conditions—in the molecule were developed, and have become non-viral nucleic acid delivery carriers most generally used at present (Non Patent Literature 1).

As lipid nanoparticles using an ionic lipid having a tertiary amine in the molecule, an example also exists in which a degradable group is added to the ionic lipid (Patent Literature 3).

As described, various non-viral carriers have been developed. However, since nucleic acids are generally unstable compounds, there are still problems with their stability as pharmaceutical preparations.

As one of the methods for improving the stability as a pharmaceutical preparation, attempts have been made to lyophilize lipid nanoparticles encapsulating nucleic acid and rehydrate them at the time of use to reconstitute the lipid nanoparticles (Patent Literature 4 and Non Patent Literature 2).

Although these methods are useful as a method for enhancing the storage stability of lipid nanoparticles encapsulating a specific nucleic acid, there is a problem as a method for more easily encapsulating any nucleic acid in lipid nanoparticles.

As a method for more easily encapsulating any nucleic acid in lipid nanoparticles, a method of preparing a lyophilized composition not containing a nucleic acid and then rehydrating same with an aqueous solution of nucleic acid, like the methods described in Patent Literatures 1 and 2, can be mentioned.

However, lipid nanoparticles obtained using ionic lipid having tertiary amine in the molecule do not electrostatically interact with nucleic acid because the surface charge after preparation is weakly negative to neutral. Thus, the method of preparing a lyophilized composition not containing a nucleic acid and then rehydrating same with an aqueous solution of nucleic acid, disclosed in Patent Literatures 1 and 2, cannot prepare nucleic acid-encapsulating lipid nanoparticles.

As described above, no means were available for easily encapsulating any nucleic acid in lipid nanoparticles with a high nucleic acid encapsulation rate.

CITATION LIST

Patent Literatures

[PTL 1]
JP-B-4919397
[PTL 2]
JP-B-4598908
[PTL 3]
JP-B-6093710
[PTL 4]
WO 2017/218704

Non Patent Literatures

[NPL 1]
Gene Therapy 6:271-281, 1999
[NPL 2]
Biol. Pharm. Bull. 41, 1291-1294(2018)

SUMMARY OF INVENTION

Technical Problem

The problems of the present invention are provision of a lyophilized composition capable of encapsulating any nucleic acid with high efficiency and easily, which could not be achieved by the prior art, and a production method of nucleic acid-encapsulating lipid nanoparticles by using the composition.

Solution to Problem

The present inventors have conducted intensive studies in view of the above-mentioned problems and found that any nucleic acid can be encapsulated with high efficiency and easily by preparing lipid nanoparticles not containing nucleic acid in an acidic buffer, further adding a cryoprotectant, lyophilizing same, and then rehydrating same with an aqueous solution containing nucleic acid. Furthermore, they conducted experiments to transfer gene into cells by using the lipid nanoparticles prepared by this method, and found that uniform gene transfer into cells is possible by increasing the concentration of the cryoprotectant before lyophilizing, which resulted in the completion of the present invention.

Accordingly, the present invention encompasses the following.

[1] A lyophilized composition of lipid nanoparticles not comprising a nucleic acid but comprising an ionic lipid, a sterol, a PEG lipid, an acidic buffer component that shows a buffering action at pH 1-6, and a cryoprotectant, wherein a weight ratio of the cryoprotectant and a total lipid is 10:1-1000:1.

[2] The lyophilized composition of [1], further comprising a phospholipid.

[3] The lyophilized composition of [1] or [2], wherein the weight ratio of the cryoprotectant and the total lipid is 30:1-1000:1.

[4] The lyophilized composition of any one of [1] to [3], wherein a concentration of the cryoprotectant in the composition before lyophilizing is 80-800 mg/mL.

[5] The lyophilized composition of any one of [1] to [4], wherein a concentration of the cryoprotectant in the composition before lyophilizing is 160-800 mg/mL.

[6] The lyophilized composition of any one of [1] to [5], wherein the ionic lipid is a compound represented by the formula (1):

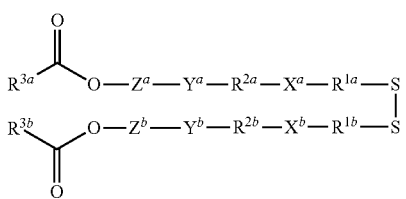

(in the formula (1),
  $R^{1a}$ and $R^{1b}$ are each independently an alkylene group having 1-6 carbon atoms,
  $X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups,
  $R^{2a}$ and $R^{2b}$ are each independently an alkylene group or an oxydialkylene group each having not more than 8 carbon atoms,
  $Y^a$ and $Y^b$ are each independently an ester bond, an amide bond, a carbamate bond, an ether bond or a urea bond,
  $Z^a$ and $Z^b$ are each independently a divalent group derived from an aromatic compound having 3-16 carbon atoms and at least one aromatic ring, and optionally having a hetero atom, and
  $R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms).

[7] The lyophilized composition of any one of [1] to [6], wherein the cryoprotectant is disaccharide.

[8] The lyophilized composition of any one of [1] to [6], wherein the cryoprotectant is sucrose.

[9] A method for producing a nucleic acid-encapsulating lipid nanoparticle, comprising the following steps:
a) a step of mixing an alcohol solution containing an ionic lipid, a sterol, and a PEG lipid, and an acidic buffer showing a buffering action at pH 1-6 to prepare a suspension of lipid nanoparticles not containing a nucleic acid,
b) a step of mixing the suspension of the lipid nanoparticles not containing a nucleic acid and a cryoprotectant to give a mixture with pH 1-6 and containing the cryoprotectant at 80-800 mg/mL,
c) a step of lyophilizing the mixture obtained in step b to give a lyophilized composition,
d) a step of mixing the lyophilized composition and an aqueous solution containing a nucleic acid and optionally containing alcohol at 0-25 v/v %, and optionally incubating the mixture at 0-95° C. for 0-60 min to give nucleic acid-encapsulating lipid nanoparticles, and
e) a step of exchanging an external aqueous phase of the obtained nucleic acid-encapsulating lipid nanoparticles with a neutral buffer by dialysis, ultrafiltration, or dilution.

[10] The method of [9], wherein the step a further comprises a step of exchanging the external aqueous phase with another acidic buffer showing a buffering action at pH 1-6, by dialysis, ultrafiltration, or dilution, after preparing the suspension of lipid nanoparticles.

[11] The method of [9] or [10], wherein the alcohol solution further comprises a phospholipid in step a.

[12] The method of any one of [9] to [11], wherein a concentration of the cryoprotectant in the mixture in step b is 160-800 mg/mL.

[13] The method of any one of [9] to [12], wherein the ionic lipid is a compound represented by the aforementioned formula (1).

[14] The method of any one of [9] to [13], wherein the cryoprotectant is disaccharide.

[15] The method of any one of [9] to [13], wherein the cryoprotectant is sucrose.

[16] A method for producing a lyophilized composition of lipid nanoparticles, comprising a step of lyophilizing a composition of lipid nanoparticles not containing a nucleic acid but containing an ionic lipid, a sterol, a PEG lipid, an acidic buffer that shows a buffering action at pH 1-6, and a cryoprotectant at 80-800 mg/mL.

[17] The method of [16], wherein the composition of lipid nanoparticles further comprises a phospholipid.

[18] The method of [16] or [17], wherein a concentration of the cryoprotectant in the composition before lyophilizing is 160-800 mg/mL.

[19] The method of any one of [16] to [18], wherein the ionic lipid is a compound represented by the aforementioned formula (1).

[20] The method of any one of [16] to [19], wherein the cryoprotectant is disaccharide.

[21] The method of any one of [16] to [19], wherein the cryoprotectant is sucrose.

[22] A nucleic acid-introducing agent comprising the lyophilized composition of any one of [1] to [8].

[23] A method for introducing a nucleic acid into a cell in vitro, comprising bringing the nucleic acid-introducing agent of [22] encapsulating the nucleic acid into contact with the cell.

[24] A method for introducing a nucleic acid into a target cell, comprising administering the nucleic acid-introducing agent of [22] encapsulating the nucleic acid to a living organism to allow for delivery of the nucleic acid to the cell.

[25] A method for introducing a nucleic acid into a cell, comprising the following steps:
a) a step of mixing an alcohol solution containing an ionic lipid, a sterol, and a PEG lipid, and an acidic buffer showing a buffering action at pH 1-6 to prepare a suspension of lipid nanoparticles not containing a nucleic acid, b) a step of mixing the suspension of the lipid nanoparticles not containing a nucleic acid and a cryoprotectant to give a mixture with pH 1-6 and containing the cryoprotectant at 80-800 mg/mL, c) a step of lyophilizing the mixture obtained in step b to give a lyophilized composition, d) a step of mixing the lyophilized composition and an aqueous solution containing the nucleic acid and optionally containing alcohol at 0-25 v/v %, and optionally incubating the mixture at 0-95° C. for 0-60 min to give nucleic acid-encapsulating lipid nanoparticles, e) a step of exchanging an external aqueous phase of the obtained nucleic acid-encapsulating lipid nanoparticles with a neutral buffer by dialysis, ultrafiltration, or dilution, and f) a step of bringing the obtained nucleic acid-encapsulating lipid nanoparticles into contact with the cell in vitro.

[26] The method of [25], wherein the step a further comprises a step of exchanging the external aqueous phase with another acidic buffer showing a buffering action at pH 1-6, by dialysis, ultrafiltration, or dilution, after preparing the suspension of lipid nanoparticles.

[27] A method for introducing a nucleic acid into a target cell, comprising the following steps:

a) a step of mixing an alcohol solution containing an ionic lipid, a sterol, and a PEG lipid, and an acidic buffer showing a buffering action at pH 1-6 to prepare a suspension of lipid nanoparticles not containing a nucleic acid, b) a step of mixing the suspension of the lipid nanoparticles not containing a nucleic acid and a cryoprotectant to give a mixture with pH 1-6 and containing the cryoprotectant at 80-800 mg/mL, c) a step of lyophilizing the mixture obtained in step b to give a lyophilized composition, d) a step of mixing the lyophilized composition and an aqueous solution containing the nucleic acid and optionally containing alcohol at 0-25 v/v %, and optionally incubating the mixture at 0-95° C. for 0-60 min to give nucleic acid-encapsulating lipid nanoparticles, e) a step of exchanging an external aqueous phase of the obtained nucleic acid-encapsulating lipid nanoparticles with a neutral buffer by dialysis, ultrafiltration, or dilution, and f) a step of administering the obtained nucleic acid-encapsulating lipid nanoparticles to a living organism to allow for delivery of the nucleic acid to the target cell.

[28] The method of [27], wherein the step a further comprises a step of exchanging the external aqueous phase with another acidic buffer showing a buffering action at pH 1-6, by dialysis, ultrafiltration, or dilution, after preparing the suspension of lipid nanoparticles.

Advantageous Effects of Invention

The present invention relates to a lyophilized composition of lipid nanoparticles not containing a nucleic acid, and a preparation method of lipid nanoparticles by using same.

The lyophilized composition of the present invention can prepare lipid nanoparticles containing any nucleic acid highly efficiently and easily by rehydration with an aqueous solution containing a nucleic acid.

The preparation method of lipid nanoparticles of the present invention can further increase the encapsulation rate of nucleic acid by incubating the lyophilized composition of the present invention by adding an aqueous solution of any nucleic acid, and further, alcohol.

When gene transfer is performed using lipid nanoparticles prepared by the method of the present invention, the gene can be uniformly introduced into cells. Further, the lipid nanoparticles prepared by the method of the present invention have a particle size of 50-200 nm and a narrow particle size distribution, which is advantageous for gene transfer in vivo.

BRIEF DESCRIPTION OF DRAWINGS

FIG. 1 shows evaluation of the influence of the sucrose concentration on the uniformity of gene transfer into cells.

FIG. 2 shows evaluation of the influence of the sucrose concentration on the expression intensity of gene transfer into cells.

FIG. 3 shows evaluation of the influence of the lipid composition when DOPC was used as a phospholipid, on the efficiency of gene transfer into cells.

FIG. 4 shows evaluation of the influence of the lipid composition when POPC was used as a phospholipid, on the efficiency of gene transfer into cells.

FIG. 5 shows evaluation of the influence of the lipid composition when DOPE was used as a phospholipid, on the efficiency of gene transfer into cells.

FIG. 6 shows evaluation of the influence of the lipid composition when POPE was used as a phospholipid, on the efficiency of gene transfer into cells.

FIG. 7 shows evaluation of in vivo mRNA expression efficiency in mouse.

FIG. 8 shows evaluation of in vivo CTL activity in mouse.

FIG. 9 shows comparison of particles prepared by a conventional method and the particles of the present invention in the efficiency of gene transfer into cells.

FIG. 10 shows comparison of particles prepared by a conventional method and the particles of the present invention in the in vivo mRNA expression efficiency in mouse.

DESCRIPTION OF EMBODIMENTS

While the embodiments of the present invention are explained in the following, the present invention is not limited thereto.

The present invention relates to a lyophilized composition of lipid nanoparticles not containing a nucleic acid but containing an ionic lipid, a sterol, a PEG lipid, an acidic buffer component that shows a buffering action at pH 1-6, and a cryoprotectant, wherein a weight ratio of the cryoprotectant and a total lipid is 10:1-1000:1.

A lipid nanoparticle means a particle having a membrane structure wherein the hydrophilic groups of amphiphilic lipid are arranged in the interface, facing the aqueous phase side. The "amphiphilic lipid" means a lipid having both a hydrophilic group showing hydrophilicity, and a hydrophobic group showing hydrophobicity. Examples of the amphiphilic lipid include ionic lipid, phospholipid, PEG lipid, and the like.

The lipid nanoparticles of the present invention contain ionic lipid, a sterol, and PEG lipid as substances constituting a membrane, and may further contain a phospholipid. The particle size of the lipid nanoparticles is not particularly limited, and is preferably 10 nm-500 nm, more preferably 30 nm-300 nm. The particle size can be measured by using a particle size distribution measuring device such as Zetasizer Nano (Malvern) or the like. The particle size of the lipid nanoparticles can be appropriately adjusted by the method for preparing the lipid nanoparticles. In the present invention, the particle size means an average particle size (number average) measured by a dynamic light scattering method.

In the present invention, the "total lipid" means the total amount of lipid. Examples of the lipid include ionic lipids, sterols, PEG lipids, and phospholipids.

In the present invention, "not containing nucleic acid" or "nucleic acid-free" means that nucleic acid is substantially not contained, and that the nucleic acid content is below the detection limit.

In the present invention, the "nucleic acid-encapsulating lipid nanoparticle" means a lipid nanoparticle in which a nucleic acid is encapsulated inside the lipid nanoparticle.

The lyophilized composition of the present invention is obtained by further adding a cryoprotectant to lipid nanoparticles that are obtained by dissolving an ionic lipid, a sterol, and a PEG lipid or further a phospholipid in a water-soluble organic solvent, and mixing same with an acidic buffer to induce organization, and lyophilizing the mixture. Examples of the water-soluble organic solvent include alcohols such as tert-butanol, ethanol and the like.

Ionic Lipid

The ionic lipid that can be used in the present invention may be any as long as it is composed of a tertiary amino group and a hydrophobic group and can constitute lipid nanoparticles.

Specific examples of the ionic lipid include 1,2-dioleoyloxy-3-dimethylaminopropane (DODAP), 1,2-dioleyloxy-3-dimethylaminopropane (DODMA), 1,2-dilinoleyloxy-3-dimethylaminopropane (DLinDMA), 2,2-dilinoleyl-4-(2-dimethylaminoethyl)-[1,3]-dioxolane (DLin-KC2-DMA), heptatriaconta-6,9,28,31-tetraen-19-yl-4-(dimethylamino)butanoate (DLin-MC3-DMA or MC3), and compounds of the following formula (1) or the formula (2). The compounds of the following formula (1) or the formula (2), DODMA, and MC3 are preferred, and the compound of the formula (1) is most preferred.

A compound represented by the formula (1)

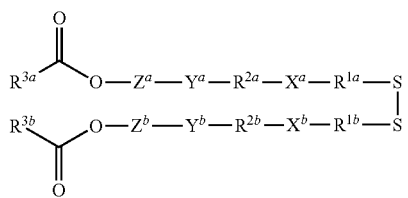

(1)

(in the formula (1), $R^{1a}$ and $R^{1b}$ are each independently an alkylene group having 1-6 carbon atoms, $X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups, $R^{2a}$ and $R^{2b}$ are each independently an alkylene group or an oxydialkylene group each having not more than 8 carbon atoms, $Y^a$ and $Y^b$ are each independently an ester bond, an amide bond, a carbamate bond, an ether bond or a urea bond, $Z^a$ and $Z^b$ are each independently a divalent group derived from an aromatic compound having 3-16 carbon atoms and at least one aromatic ring, and optionally having a hetero atom, and $R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms).

$R^{1a}$ and $R^{1b}$ are each independently an alkylene group having 1-6 carbon atoms, and may be linear or branched, preferably linear. The carbon number of the alkylene group is preferably 1-4, more preferably 1-2. Specific examples of the alkylene group having 1-6 carbon atoms include methylene group, ethylene group, trimethylene group, isopropylene group, tetramethylene group, isobutylene group, pentamethylene group, neopentylene group and the like. Preferably, $R^{1a}$ and $R^{1b}$ are each independently a methylene group, an ethylene group, a trimethylene group, an isopropylene group or a tetramethylene group, most preferably an ethylene group.

$R^{1a}$ may be the same as or different from $R^{1b}$, and $R^{1a}$ is preferably the same group as $R^{1b}$.

$X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups, preferably each independently a cyclic alkylene tertiary amino group having 2-5 carbon atoms and 1-2 tertiary amino groups.

The alkyl group having 1-6 carbon atoms in the non-cyclic alkyl tertiary amino group having 1-6 carbon atoms and one tertiary amino group may be linear, branched or cyclic. The alkyl group preferably has a carbon number of 1-3. Specific examples of the alkyl group having 1-6 carbon atoms include methyl group, ethyl group, propyl group, isopropyl group, n-butyl group, sec-butyl group, isobutyl group, tert-butyl group, pentyl group, isopentyl group, neopentyl group, t-pentyl group, 1,2-dimethylpropyl group, 2-methylbutyl group, 2-methylpentyl group, 3-methylpentyl group, 2,2-dimethylbutyl group, 2,3-dimethylbutyl group, cyclohexyl group and the like, preferably methyl group, ethyl group, propyl group or isopropyl group, most preferably methyl group.

A preferable specific structure of the non-cyclic alkyl tertiary amino group having 1-6 carbon atoms and one tertiary amino group is represented by $X^1$.

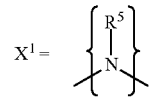

$R^5$ in $X^1$ is an alkyl group having 1-6 carbon atoms, which may be linear, branched or cyclic. The alkyl group preferably has a carbon number of 1-3. Specific examples of the alkyl group having 1-6 carbon atoms include methyl group, ethyl group, propyl group, isopropyl group, n-butyl group, sec-butyl group, isobutyl group, tert-butyl group, pentyl group, isopentyl group, neopentyl group, t-pentyl group, 1,2-dimethylpropyl group, 2-methylbutyl group, 2-methylpentyl group, 3-methylpentyl group, 2,2-dimethylbutyl group, 2,3-dimethylbutyl group, cyclohexyl group and the like. $R^5$ is preferably methyl group, ethyl group, propyl group or isopropyl group, most preferably methyl group.

The carbon number of the cyclic alkylene tertiary amino group having 2-5 carbon atoms and 1-2 tertiary amino groups is preferably 4-5. The cyclic alkylene tertiary amino group having 2-5 carbon atoms and 1-2 tertiary amino groups is specifically aziridylene group, azetidylene group, pyrrolidylene group, piperidylene group, imidazolidylene group, or piperazylene group, preferably pyrrolidylene group, piperidylene group, or piperazylene group, most preferably piperidylene group.

A preferable specific structure of the cyclic alkylene tertiary amino group having 2-5 carbon atoms and one tertiary amino group is represented by $X^2$.

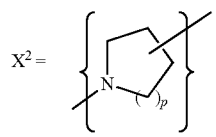

The p of $X^2$ is 1 or 2. When p is 1, $X^2$ is a pyrrolidylene group, and when p is 2, $X^2$ is a piperidylene group. Preferably, p is 2.

A preferable specific structure of the cyclic alkylene tertiary amino group having 2-5 carbon atoms and two tertiary amino groups is represented by $X^3$.

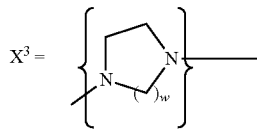

The w of $X^3$ is 1 or 2. When w is 1, $X^3$ is an imidazolidylene group, and when w is 2, $X^3$ is a piperazylene group.

$X^a$ may be the same as or different from $X^b$, and $X^a$ is preferably the same group as $X^b$.

$R^{2a}$ and $R^{2b}$ are each independently an alkylene group or an oxydialkylene group each having not more than 8 carbon atoms, preferably each independently an alkylene group having not more than 8 carbon atoms.

The alkylene group having not more than 8 carbon atoms may be linear or branched, preferably linear. The number of carbons contained in the alkylene group is preferably not more than 6, most preferably not more than 4. Specific examples of the alkylene group having not more than 8 carbon atoms include methylene group, ethylene group, propylene group, isopropylene group, tetramethylene group, isobutylene group, pentamethylene group, hexamethylene group, heptamethylene group, octamethylene group and the like, preferably methylene group, ethylene group, propylene group, and tetramethylene group, most preferably ethylene group.

The oxydialkylene group having not more than 8 carbon atoms contains alkylene groups via an ether bond (alkylene-O-alkylene), wherein the total carbon number of the two alkylene groups present is 8 or below. The two alkylene groups present may be the same or different, preferably the same. Specific examples of the oxydialkylene group having not more than 8 carbon atoms include oxydimethylene group, oxydiethylene group, oxydipropylene group, oxydibutylene group and the like. Preferably, it is oxydimethylene group, oxydiethylene group, or oxydipropylene group, most preferably oxydiethylene group.

$R^{2a}$ may be the same as or different from $R^{2b}$, and $R^{2a}$ is preferably the same group as $R^{2b}$.

$Y^a$ and $Y^b$ are each independently an ester bond, an amide bond, a carbamate bond, an ether bond or a urea bond, preferably each independently an ester bond, an amide bond or a carbamate bond, more preferably each independently an ester bond or an amide bond, most preferably each an ester bond. The direction of the bond of $Y^a$ and $Y^b$ is not limited. When $Y^a$ and $Y^b$ are ester bonds, the structure of —$Z^a$—CO—O—$R^{2a}$— or —$Z^b$—CO—O—$R^{2b}$— is preferably shown.

$Y^a$ may be the same as or different from $Y^b$, and $Y^a$ is preferably the same group as $Y^b$.

$Z^a$ and $Z^b$ are each independently a divalent group derived from an aromatic compound having 3-16 carbon atoms and at least one aromatic ring, and optionally having a hetero atom. The number of carbons contained in the aromatic compound is preferably 6-12, most preferably 6-7. The aromatic ring contained in the aromatic compound is preferably one.

As the kind of the aromatic ring contained in the aromatic compound having 3-16 carbon atoms, benzene ring, naphthalene ring, and anthracene ring can be mentioned for aromatic hydrocarbocycle, and imidazole ring, pyrazole ring, oxazole ring, isoxazole ring, thiazole ring, isothiazole ring, triazine ring, pyrrole ring, furanthiophene ring, pyrimidine ring, pyridazine ring, pyrazine ring, pyridine ring, purine ring, pteridine ring, benzimidazole ring, indole ring, benzofuran ring, quinazoline ring, phthalazine ring, quinoline ring, isoquinoline ring, coumarin ring, chromone ring, benzodiazepine ring, phenoxazine ring, phenothiazine ring, acridine ring and the like can be mentioned for aromatic heterocycle. It is preferably benzene ring, naphthalene ring, or anthracene ring, most preferably benzene ring.

The aromatic ring may have a substituent. Examples of the substituent include acyl group having 2-4 carbon atoms, alkoxycarbonyl group having 2-4 carbon atoms, carbamoyl group having 2-4 carbon atoms, acyloxy group having 2-4 carbon atoms, acylamino group having 2-4 carbon atoms, alkoxycarbonylamino group having 2-4 carbon atoms, fluorine atom, chlorine atom, bromine atom, iodine atom, alkylsulfanyl group having 1-4 carbon atoms, alkylsulfonyl group having 1-4 carbon atoms, arylsulfonyl group having 6-10 carbon atoms, nitro group, trifluoromethyl group, cyano group, alkyl group having 1-4 carbon atoms, ureido group having 1-4 carbon atoms, alkoxy group having 1-4 carbon atoms, aryl group having 6-10 carbon atoms, aryloxy group having 6-10 carbon atoms, and the like. Preferable examples include acetyl group, methoxycarbonyl group, methylcarbamoyl group, acetoxy group, acetamido group, methoxycarbonylamino group, fluorine atom, chlorine atom, bromine atom, iodine atom, methylsulfanyl group, phenylsulfonyl group, nitro group, trifluoromethyl group, cyano group, methyl group, ethyl group, propyl group, isopropyl group, t-butyl group, ureido group, methoxy group, ethoxy group, propoxy group, isopropoxy group, t-butoxy group, phenyl group, phenoxy group and the like.

A preferable specific structure of $Z^a$ and $Z^b$ is $Z^1$.

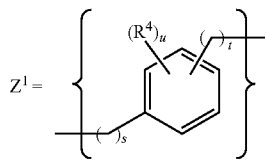

wherein s is an integer of 0-3, t is an integer of 0-3, u is an integer of 0-4, and $R^4$ in the number of u are each independently a substituent.

The s for $Z^1$ is preferably an integer of 0-1, more preferably 0.

The t for $Z^1$ is preferably an integer of 0-2, more preferably 1.

The u for $Z^1$ is preferably an integer of 0-2, more preferably an integer of 0-1.

The $R^4$ for $Z^1$ is a substituent of an aromatic ring (benzene ring) contained in the aromatic compound having 3-16 carbon atoms which does not inhibit the reaction in the synthesis process of a cationic lipid. Examples of the substituent include acyl group having 2-4 carbon atoms, alkoxycarbonyl group having 2-4 carbon atoms, carbamoyl group having 2-4 carbon atoms, acyloxy group having 2-4 carbon atoms, acylamino group having 2-4 carbon atoms, alkoxycarbonylamino group having 2-4 carbon atoms, fluorine atom, chlorine atom, bromine atom, iodine atom, alkylsulfanyl group having 1-4 carbon atoms, alkylsulfonyl group having 1-4 carbon atoms, arylsulfonyl group having 6-10 carbon atoms, nitro group, trifluoromethyl group, cyano group, alkyl group having 1-4 carbon atoms, ureido group having 1-4 carbon atoms, alkoxy group having 1-4 carbon atoms, aryl group having 6-10 carbon atoms, aryloxy group having 6-10 carbon atoms, and the like. Preferable examples include acetyl group, methoxycarbonyl group, methylcarbamoyl group, acetoxy group, acetamido group, methoxycarbonylamino group, fluorine atom, chlorine atom, bromine atom, iodine atom, methylsulfanyl group, phenylsulfonyl group, nitro group, trifluoromethyl group, cyano group, methyl group, ethyl group, propyl group, isopropyl group, t-butyl group, ureido group, methoxy group, ethoxy group, propoxy group, isopropoxy group, t-butoxy group, phenyl group, phenoxy group and the like. When $R^4$ is present in plurality, each $R^4$ may be the same or different.

$Z^a$ may be the same as or different from $Z^b$, and $Z^a$ is preferably the same group as $Z^b$.

$R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms, preferably each independently a residue derived from a reaction product of a liposoluble vitamin having a hydroxyl group, and succinic anhydride or glutaric anhydride, or an aliphatic hydrocarbon group having 12-22 carbon atoms, most preferably each independently an aliphatic hydrocarbon group having 12-22 carbon atoms.

The liposoluble vitamin having a hydroxyl group is, for example, retinol, ergosterol, 7-dehydrocholesterol, calciferol, cholecalciferol, dihydroergocalciferol, dihydrotachys-terol, tocopherol, tocotrienol and the like. Preferred example of the liposoluble vitamin having a hydroxyl group is tocopherol.

Examples of the sterol derivative having a hydroxyl group include cholesterol, cholestanol, stigmasterol, β-sitosterol, lanosterol, and ergosterol and the like, preferably cholesterol or cholestanol.

The aliphatic hydrocarbon group having 12-22 carbon atoms may be linear or branched. The aliphatic hydrocarbon group may be saturated or unsaturated. In the case of an unsaturated aliphatic hydrocarbon group, the aliphatic hydrocarbon group generally contains 1-6, preferably 1-3, more preferably 1-2 unsaturated bonds. While the unsaturated bond includes a carbon-carbon double bond and a carbon-carbon triple bond, it is preferably a carbon-carbon double bond. The aliphatic hydrocarbon group has a carbon number of preferably 13-19, most preferably 13-17. While the aliphatic hydrocarbon group includes an alkyl group, an alkenyl group, an alkynyl group and the like, it is preferably an alkyl group or an alkenyl group. Specific examples of the aliphatic hydrocarbon group having 12-22 carbon atoms include dodecyl group, tridecyl group, tetradecyl group, pentadecyl group, hexadecyl group, heptadecyl group, octadecyl group, nonadecyl group, icosyl group, henicosyl group, docosyl group, dodecenyl group, tridecenyl group, tetradecenyl group, pentadecenyl group, hexadecenyl group, heptadecenyl group, octadecenyl group, nonadecenyl group, icosenyl group, henicosenyl group, docosenyl group, decadienyl group, tridecadienyl group, tetradecadienyl group, pentadecadienyl group, hexadecadienyl group, heptadecadienyl group, octadecadienyl group, nonadecadienyl group, icosadienyl group, henicosadienyl group, docosadienyl group, octadecatrienyl group, icosatrienyl group, icosatetraenyl group, icosapentaenyl group, docosahexaenyl group, isostearyl group, 1-hexylheptyl group, 1-hexylnonyl group, 1-octylnonyl group, 1-octylundecyl group, 1-decylundecyl group and the like. The aliphatic hydrocarbon group having 12-22 carbon atoms is preferably tridecyl group, pentadecyl group, heptadecyl group, nonadecyl group, heptadecenyl group, heptadecadienyl group, or 1-hexylnonyl group, particularly preferably tridecyl group, heptadecyl group, heptadecenyl group, or heptadecadienyl group.

In one embodiment of the present invention, the aliphatic hydrocarbon group having 12-22 carbon atoms for $R^{3a}$ or $R^{3b}$ is derived from fatty acid. In this case, the carbonyl carbon derived from fatty acid is contained in —CO—O— in the formula (1). A specific example of the aliphatic hydrocarbon group is a heptadecadienyl group when linoleic acid is used as the fatty acid, and heptadecenyl group when oleic acid is used as the fatty acid.

$R^{3a}$ may be the same as or different from $R^{3b}$, and $R^{3a}$ is preferably the same group as $R^{3b}$.

In one embodiment of the present invention, $R^{1a}$ is the same as $R^{1b}$, $X^a$ is the same as $X^b$, $R^{2a}$ is the same as $R^{2b}$, $Y^a$ is the same as $Y^b$, $Z^a$ is the same as $Z^b$, and $R^{3a}$ is the same as $R^{3b}$.

Preferable examples of the cationic lipid represented by the formula (1) include the following cationic lipids.

[Cationic Lipid (1-1)]

Cationic lipid (1) wherein
$R^{1a}$ and $R^{1b}$ are each independently an alkylene group having 1-6 carbon atoms (e.g., methylene group, ethylene group);

$X^a$ and $X^b$ are each independently a non-cyclic alkyl tertiary amino group having 1-6 carbon atoms and one tertiary amino group (e.g., —N(CH$_3$)—), or a cyclic alkylene tertiary amino group having 2-5 carbon atoms and 1-2 tertiary amino groups (e.g., piperidylene group);

$R^{2a}$ and $R^{2b}$ are each independently an alkylene group having not more than 8 carbon atoms (e.g., methylene group, ethylene group, propylene group);

$Y^a$ and $Y^b$ are each independently an ester bond or an amide bond;

$Z^a$ and $Z^b$ are each independently a divalent group derived from an aromatic compound having 3-16 carbon atoms and at least one aromatic ring, and optionally having a hetero atom (e.g., —$C_6H_4$—$CH_2$—, —$CH_2$—$C_6H_4$—$CH_2$—); and $R^{3a}$ and $R^{3b}$ are each independently a residue derived from a reaction product of a liposoluble vitamin having a hydroxyl group (e.g., tocopherol), and succinic anhydride or glutaric anhydride, or an aliphatic hydrocarbon group having 12-22 carbon atoms (e.g., heptadecenyl group, heptadecadienyl group, 1-hexylnonyl group).

[Cationic Lipid (1-2)]

Cationic lipid (1) wherein $R^{1a}$ and $R^{1b}$ are each independently an alkylene group having 1-4 carbon atoms (e.g., methylene group, ethylene group);

$X^a$ and $X^b$ are each independently a non-cyclic alkyl tertiary amino group having 1-3 carbon atoms and one tertiary amino group (e.g., —$N(CH_3)$—), or a cyclic alkylene tertiary amino group having 2-5 carbon atoms and one tertiary amino group (e.g., piperidylene group);

$R^{2a}$ and $R^{2b}$ are each independently an alkylene group having not more than 6 carbon atoms (e.g., methylene group, ethylene group, propylene group);

$Y^a$ and $Y^b$ are each independently an ester bond or an amide bond;

$Z^a$ and $Z^b$ are each independently a divalent group derived from an aromatic compound having 6-12 carbon atoms and one aromatic ring, and optionally having a hetero atom (e.g., —$C_6H_4$—$CH_2$—, —$CH_2$—$C_6H_4$—$CH_2$—); and $R^{3a}$ and $R^{3b}$ are each independently a residue derived from a reaction product of a liposoluble vitamin having a hydroxyl group (e.g., tocopherol), and succinic anhydride, or an aliphatic hydrocarbon group having 13-19 carbon atoms (e.g., heptadecenyl group, heptadecadienyl group, 1-hexylnonyl group).

[Cationic Lipid (1-3)]

Cationic lipid (1) wherein $R^{1a}$ and $R^{1b}$ are each independently an alkylene group having 1-2 carbon atoms (e.g., methylene group, ethylene group);

$X^a$ and $X^b$ are each independently $X^1$:

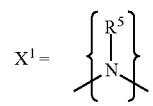

wherein $R^5$ is an alkyl group having 1-3 carbon atoms (e.g., a methyl group), or $X^2$:

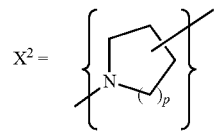

wherein p is 1 or 2;

$R^{2a}$ and $R^{2b}$ are each independently alkylene group having not more than 4 carbon atoms (e.g., methylene group, ethylene group, propylene group);

$Y^a$ and $Y^b$ are each independently an ester bond or an amide bond;

$Z^a$ and $Z^b$ are each independently $Z^1$:

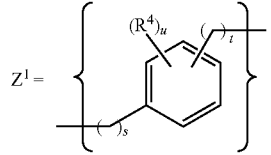

wherein s is an integer of 0-1, t is an integer of 0-2, u is an integer of 0-2 (preferably 0), and $R^4$ in the number of u are each independently a substituent; and $R^{3a}$ and $R^{3b}$ are each independently a residue derived from a reaction product of a liposoluble vitamin having a hydroxyl group (e.g., tocopherol) and succinic anhydride, or an aliphatic hydrocarbon group having 13-17 carbon atoms (e.g., heptadecenyl group, heptadecadienyl group, 1-hexylnonyl group).

Specific examples of the cationic lipid represented by the formula (1) include the following O-Ph-P3C1, O-Ph-P4C1, O-Ph-P4C2, O-Bn-P4C2, E-Ph-P4C2, L-Ph-P4C2, HD-Ph-P4C2, O-Ph-amide-P4C2, and O-Ph-C3M.

TABLE 1

| name of cationic lipid | structure |
|---|---|
| O-Ph-P3C1 | |

TABLE 1-continued
| name of cationic lipid | structure |
|---|---|
| O-Ph-P4C1 | 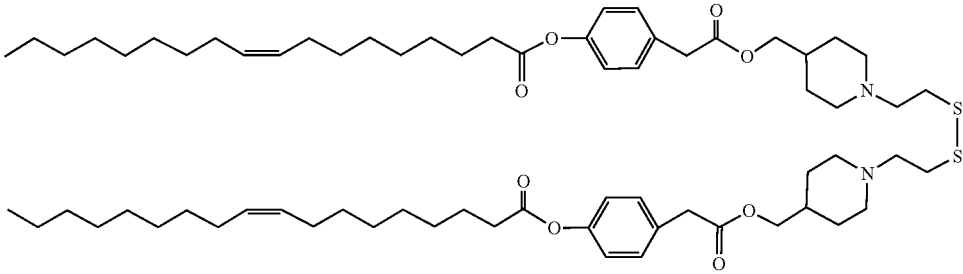 [SMILES: CCCCCCCC/C=C\CCCCCCCC(=O)Oc1ccc(CC(=O)OCC2CCN(CCSSCCN3CCC(COC(=O)Cc4ccc(OC(=O)CCCCCCC/C=C\CCCCCCCC)cc4)CC3)CC2)cc1] |
| O-Ph-P4C2 (or SS-OP) | 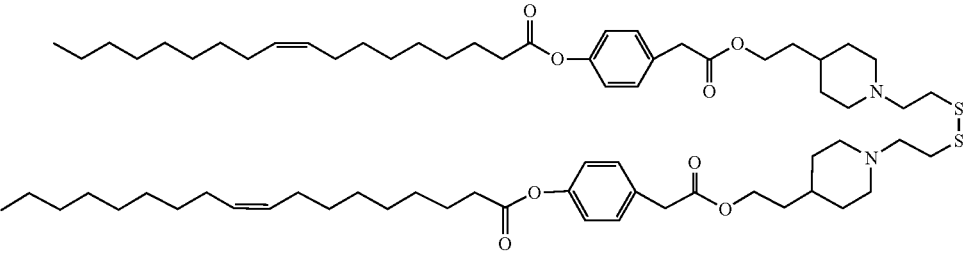 [SMILES: CCCCCCCC/C=C\CCCCCCCC(=O)Oc1ccc(CC(=O)OCCC2CCN(CCSSCCN3CCC(CCOC(=O)Cc4ccc(OC(=O)CCCCCCC/C=C\CCCCCCCC)cc4)CC3)CC2)cc1] |
| O-Bn-P4C2 | 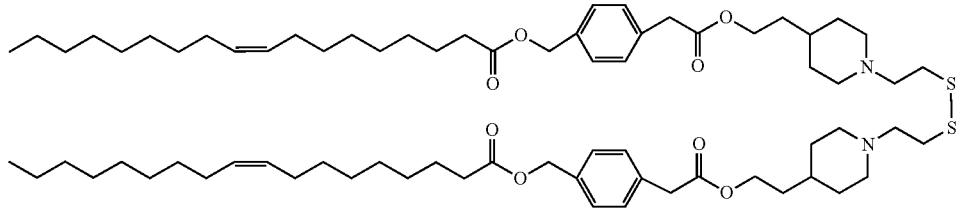 [SMILES: CCCCCCCC/C=C\CCCCCCCC(=O)OCc1ccc(CC(=O)OCCC2CCN(CCSSCCN3CCC(CCOC(=O)Cc4ccc(COC(=O)CCCCCCC/C=C\CCCCCCCC)cc4)CC3)CC2)cc1] |
| E-Ph-P4C2 (or SS-EP) | 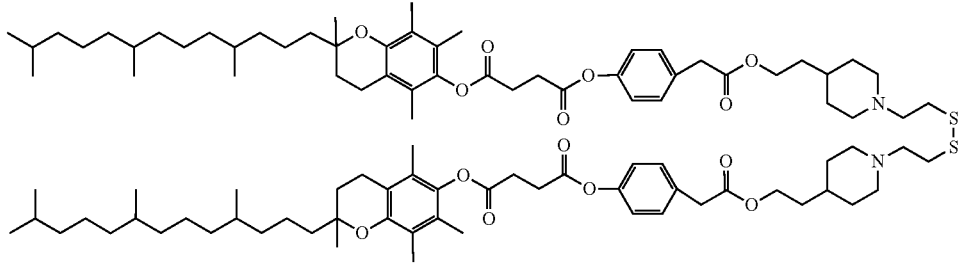 [SMILES: Cc1c(C)c2c(c(C)c1OC(=O)CCC(=O)Oc1ccc(CC(=O)OCCC3CCN(CCSSCCN4CCC(CCOC(=O)Cc5ccc(OC(=O)CCC(=O)Oc6c(C)c(C)c7c(c6C)CCC(C)(CCCC(C)CCCC(C)CCCC(C)C)O7)cc5)CC4)CC3)cc1)CCC(C)(CCCC(C)CCCC(C)CCCC(C)C)O2] |
| L-Ph-P4C2 | 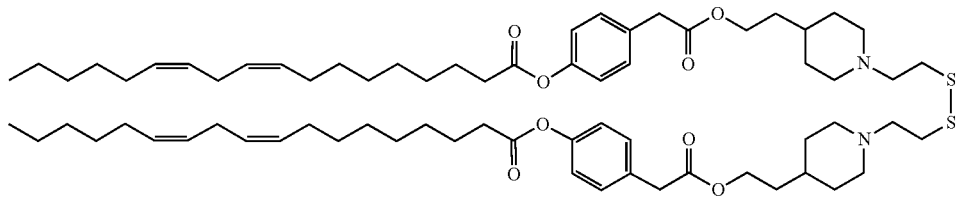 [SMILES: CCCCC/C=C\C/C=C\CCCCCCCC(=O)Oc1ccc(CC(=O)OCCC2CCN(CCSSCCN3CCC(CCOC(=O)Cc4ccc(OC(=O)CCCCCCC/C=C\C/C=C\CCCCC)cc4)CC3)CC2)cc1] |

TABLE 1-continued

| name of cationic lipid | structure |
|---|---|
| HD-Ph-P4C2 | 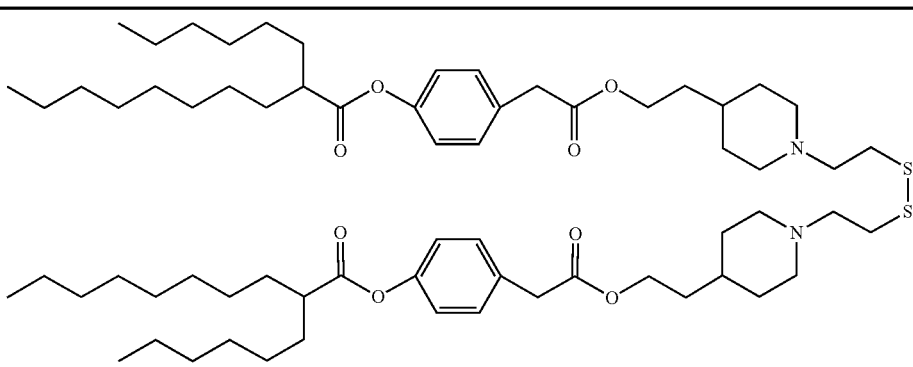 |
| O-Ph-amide-P4C2 | 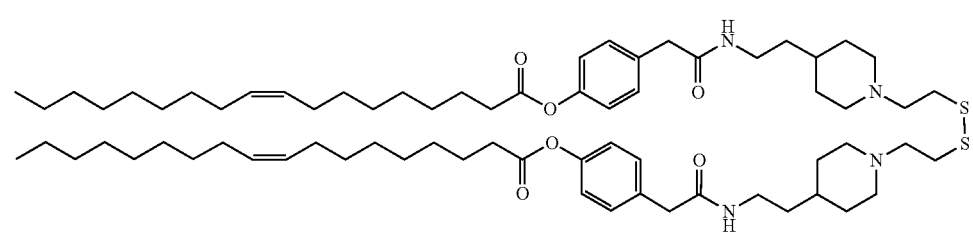 |
| O-Ph-C3M | 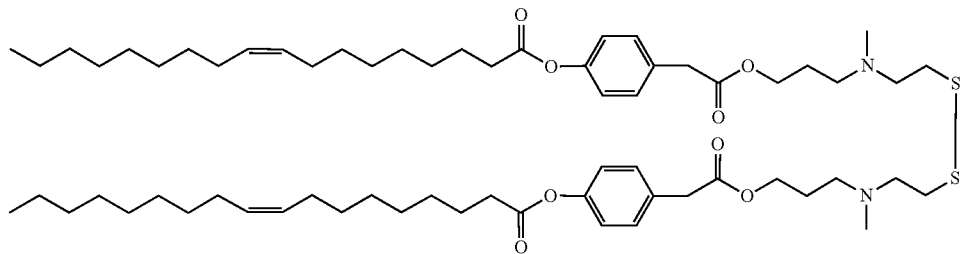 [SMILES: CCCCCCCC/C=C\CCCCCCCC(=O)Oc1ccc(CC(=O)OCCCN(C)CCSSCCN(C)CCCOC(=O)Cc2ccc(OC(=O)CCCCCCC/C=C\CCCCCCCC)cc2)cc1] |

Formula (2)

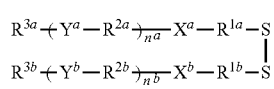

In the formula (2), $X^a$ and $X^b$ are independently $X^1$ or $X^2$, preferably $X^1$, shown below.

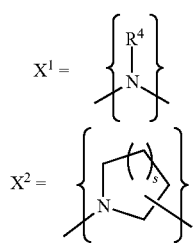

$R^4$ in $X^1$ is an alkyl group having 1-6 carbon atoms, which may be linear, branched or cyclic. The alkyl group preferably has a carbon number of 1-3. Specific examples of the alkyl group having 1-6 carbon atoms include methyl group, ethyl group, propyl group, isopropyl group, n-butyl group, sec-butyl group, isobutyl group, tert-butyl group, pentyl group, isopentyl group, neopentyl group, t-pentyl group, 1,2-dimethylpropyl group, 2-methylbutyl group, 2-methylpentyl group, 3-methylpentyl group, 2,2-dimethylbutyl group, 2,3-dimethylbutyl group, cyclohexyl group and the like. $R^4$ is preferably methyl group, ethyl group, propyl group or isopropyl group, most preferably methyl group.

The s in $X^2$ is 1 or 2. When s is 1, $X^2$ is preferably a pyrrolidylene group, and when s is 2, $X^2$ is preferably a piperidylene group. Preferably, s is 2.

$X^a$ may be the same as or different from $X^b$, and $X^a$ is preferably the same group as $X^b$.

$n^a$ and $n^b$ are each independently 0 or 1, preferably 1. When $n^a$ is 1, $R^{3a}$ binds to $X^a$ via $Y^a$ and $R^{2a}$, and when $n^a$ is 0, a structure of $R^{3a}$—$X^a$—$R^{1a}$—S— is taken. Similarly, when $n^b$ is 1, $R^{3b}$ binds to $X^b$ via $Y^b$ and $R^{2b}$, and when $n^b$ is 0, a structure of $R^{3b}$—$X^b$—$R^{1b}$—S— is taken.

$n^a$ may be the same as or different from $n^b$, and $n^a$ is preferably the same as $n^b$.

$R^{1a}$ and $R^{1b}$ are each independently an alkylene group having 1-6 carbon atoms, which may be linear or branched, preferably linear. Specific examples of the alkylene group having 1-6 carbon atoms include methylene group, ethylene group, trimethylene group, isopropylene group, tetramethylene group, isobutylene group, pentamethylene group, neopentylene group and the like. $R^{1a}$ and $R^{1b}$ are each preferably methylene group, ethylene group, trimethylene group, isopropylene group or tetramethylene group, most preferably ethylene group.

$R^{1a}$ may be the same as or different from $R^{1b}$, and $R^{1a}$ is preferably the same group as $R^{1b}$.

$R^{2a}$ and $R^{2b}$ are each independently an alkylene group having 1-6 carbon atoms, which may be linear or branched, preferably linear. Examples of the alkylene group having 1-6 carbon atoms include those recited as the examples of the alkylene group having 1-6 carbon atoms for $R^{1a}$ or $R^{1b}$. $R^{2a}$ and $R^{2b}$ are each preferably methylene group, ethylene group, trimethylene group, isopropylene group or tetramethylene group, most preferably trimethylene group.

$R^{2a}$ may be the same as or different from $R^{2b}$, and $R^{2a}$ is preferably the same group as $R^{2b}$.

$Y^{a}$ and $Y^{b}$ are each independently an ester bond, an amide bond, a carbamate bond, an ether bond or a urea bond, preferably an ester bond, an amide bond or a carbamate bond, most preferably an ester bond. While the binding direction of $Y^{a}$ and $Y^{b}$ is not limited, when $Y^{a}$ is an ester bond, a structure of $R^{3a}$—CO—O—$R^{2a}$— is preferable, and when $Y^{b}$ is an ester bond, a structure of $R^{3b}$—CO—O—$R^{2b}$— is preferable.

$Y^{a}$ may be the same as or different from $Y^{b}$, and $Y^{a}$ is preferably the same group as $Y^{b}$.

$R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms, preferably each independently a residue derived from a reaction product of a liposoluble vitamin having a hydroxyl group, and succinic anhydride or glutaric anhydride, or an aliphatic hydrocarbon group having 12-22 carbon atoms, most preferably each independently an aliphatic hydrocarbon group having 12-22 carbon atoms.

The liposoluble vitamin having a hydroxyl group is, for example, retinol, ergosterol, 7-dehydrocholesterol, calciferol, cholecalciferol, dihydroergocalciferol, dihydrotachysterol, tocopherol, tocotrienol and the like. Preferred example of the liposoluble vitamin having a hydroxyl group is tocopherol.

Examples of the sterol derivative having a hydroxyl group include cholesterol, cholestanol, stigmasterol, β-sitosterol, lanosterol, and ergosterol and the like, preferably cholesterol or cholestanol.

The aliphatic hydrocarbon group having 12-22 carbon atoms may be linear or branched. The aliphatic hydrocarbon group may be saturated or unsaturated. In the case of an unsaturated aliphatic hydrocarbon group, the aliphatic hydrocarbon group generally contains 1-6, preferably 1-3, more preferably 1-2 unsaturated bonds. While the unsaturated bond includes a carbon-carbon double bond and a carbon-carbon triple bond, it is preferably a carbon-carbon double bond. The aliphatic hydrocarbon group has a carbon number of preferably 13-19, most preferably 13-17. While the aliphatic hydrocarbon group includes an alkyl group, an alkenyl group, an alkynyl group and the like, it is preferably an alkyl group or an alkenyl group. Specific examples of the aliphatic hydrocarbon group having 12-22 carbon atoms include dodecyl group, tridecyl group, tetradecyl group, pentadecyl group, hexadecyl group, heptadecyl group, octadecyl group, nonadecyl group, icosyl group, henicosyl group, docosyl group, dodecenyl group, tridecenyl group, tetradecenyl group, pentadecenyl group, hexadecenyl group, heptadecenyl group, octadecenyl group, nonadecenyl group, icosenyl group, henicosenyl group, docosenyl group, decadienyl group, tridecadienyl group, tetradecadienyl group, pentadecadienyl group, hexadecadienyl group, heptadecadienyl group, octadecadienyl group, nonadecadienyl group, icosadienyl group, henicosadienyl group, docosadienyl group, octadecatrienyl group, icosatrienyl group, icosatetraenyl group, icosapentaenyl group, docosahexaenyl group, isostearyl group, 1-hexylheptyl group, 1-hexylnonyl group, 1-octylnonyl group, 1-octylundecyl group, 1-decylundecyl group and the like. The aliphatic hydrocarbon group having 12-22 carbon atoms is preferably tridecyl group, pentadecyl group, heptadecyl group, nonadecyl group, heptadecenyl group, heptadecadienyl group, or 1-hexylnonyl group, particularly preferably tridecyl group, heptadecyl group, heptadecenyl group, or heptadecadienyl group.

In one embodiment of the present invention, the aliphatic hydrocarbon group having 12-22 carbon atoms for $R^{3a}$ or $R^{3b}$ is derived from fatty acid. In this case, the carbonyl carbon derived from fatty acid is contained in —CO—O— in the formula (1). A specific example of the aliphatic hydrocarbon group is a heptadecadienyl group when linoleic acid is used as the fatty acid, and heptadecenyl group when oleic acid is used as the fatty acid.

$R^{3a}$ may be the same as or different from $R^{3b}$, and $R^{3a}$ is preferably the same group as $R^{3b}$.

In one embodiment of the present invention, $R^{1a}$ is the same as $R^{1b}$, $X^{a}$ is the same as $X^{b}$, $R^{2a}$ is the same as $R^{2b}$, $Y^{a}$ is the same as $Y^{b}$, and $R^{3a}$ is the same as $R^{3b}$.

Specific examples of the cationic lipid represented by the formula (2) include the following B-2, B-2-5, TS-P4C2, L-P4C2, and O—P4C2.

TABLE 2

| name of cationic lipid | structure |
|---|---|
| B-2 | 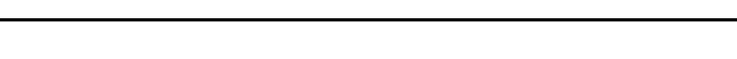 |

TABLE 2-continued

| name of cationic lipid | structure |
|---|---|
| B-2-5 | |
| TS-P4C2 | |
| L-P4C2 | |
| O-P4C2 | |

The production method of the cationic lipid represented by the formula (1) (hereinafter to be also referred to as cationic lipid (1)) is explained below.

The cationic lipid (1) has an —S—S— (disulfide) bond. Therefore, the production method includes, for example, a method including producing SH (thiol) compound having $R^{3a}$—CO—O—$Z^a$—$Y^a$—$R^{2a}$—$X^a$—$R^{1a}$— and SH (thiol) compound having $R^{3b}$—CO—O—$Z^b$—$Y^b$—$R^{2b}$—$X^b$—$R^{1b}$—, subjecting them to oxidation (coupling) to give the cationic lipid (1) containing —S—S— bond, a method including sequentially bonding necessary parts to a compound containing an —S—S— bond to finally obtain the cationic lipid (1) and the like. The latter method is preferred.

A specific example of the latter method is shown below; however, the production method is not limited thereto.

Examples of the starting compound include —S—S— bond-containing two terminal carboxylic acid, two terminal amine, two terminal isocyanate, two terminal alcohol, two terminal alcohol having a leaving group such as methanesulfonyl group and the like, a two terminal carbonate having a leaving group such as p-nitrophenylcarbonate group and the like, and the like.

For example, cationic lipid (1) wherein $R^{1a}$ and $R^{1b}$ are the same and each is $R^1$, $X^a$ and $X^b$ are the same and each is X, $R^{2a}$ and $R^{2b}$ are the same and each is $R^2$, $Y^a$ and $Y^b$ are the same and each is Y, $Z^a$ and $Z^b$ are the same and each is Z, and $R^{3a}$ and $R^{3b}$ are the same and each is $R^3$ is to be produced, a desired cationic lipid of the formula (1') can be obtained by the synthesis pathway shown below.

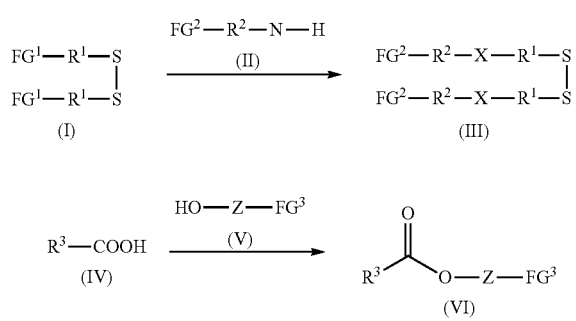
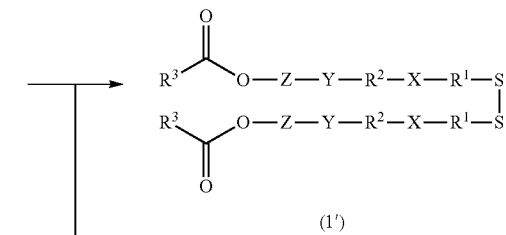

The both terminal functional groups (FG$^1$) in compound (I) containing an —S—S— bond is reacted with a secondary amine in compound (II) having the secondary amine and one functional group (FG$^2$) on the terminal to synthesize compound (III). Compound (IV) having R$^3$ is reacted with a hydroxyl group in compound (V) containing Z and having the hydroxyl group and a reactive functional group (FG$^3$) to synthesize compound (VI), and finally, the reactive functional group (FG$^3$) of compound (VI) and the reactive functional group (FG$^2$) of compound (III) are reacted, whereby a cationic lipid of the formula (1') containing an —S—S— bond, R$^1$, X, R$^2$, Y, Z and R$^3$ can be obtained.

Compound (III) can be produced by the method described in US 2014/0335157 A1 or WO 2016/121942, from among the aforementioned production methods.

In the reaction of compound (IV) and compound (V), a base catalyst such as potassium carbonate, sodium carbonate, potassium hydroxide, triethylamine, 4-dimethylaminopyridine (hereinafter to be referred to as "DMAP") and the like may be used as a catalyst, and the reaction may be performed in the presence of an acid catalyst such as p-toluenesulfonic acid, methanesulfonic acid and the like, or without a catalyst.

In addition, compound (IV) and compound (V) may be directly reacted using a condensing agent such as dicyclohexylcarbodiimide (hereinafter to be referred to as "DCC"), diisopropylcarbodiimide (hereinafter to be referred to as "DIC"), 1-ethyl-3-(3-dimethylaminopropyl)carbodiimide hydrochloride (hereinafter to be referred to as "EDC") and the like. Alternatively, compound (IV) may be once converted to an anhydride or the like using a condensing agent and then reacted with compound (V).

The amount of compound (IV) to be charged is generally 1-50 molar equivalents, preferably 1-10 molar equivalents, based on compound (V).

The catalyst to be used for the reaction of compound (IV) and compound (V) may be appropriately selected according to the kind of the compound to be reacted.

The amount of the catalyst is generally 0.05-100 molar equivalents, preferably 0.1-20 molar equivalents, more preferably 0.1-5 molar equivalent, relative to compound (V).

The solvent to be used for the reaction of compound (IV) and compound (V) is not particularly limited as long as it is a solvent that does not inhibit the reaction. For example, water, ethyl acetate, dichloromethane, chloroform, acetonitrile, toluene and the like can be mentioned. Among these, chloroform or toluene is preferable.

The reaction temperature is generally 0-150° C., preferably 0-80° C., more preferably 10-50° C., and the reaction time is generally 1-48 hr, preferably 1-24 hr.

The reaction product (VI) obtained by the above-mentioned reaction can be appropriately purified by a general purification method, for example, extraction purification, recrystallization, adsorption purification, reprecipitation, column chromatography, ion exchange chromatography and the like.

When compound (III) and compound (VI) are reacted, a base catalyst such as potassium carbonate, sodium carbonate, potassium hydroxide, triethylamine, 4-dimethylaminopyridine and the like may be used as a catalyst as in the reaction of compound (IV) and compound (V), and the reaction may be performed in the presence of an acid catalyst such as p-toluenesulfonic acid, methanesulfonic acid and the like, or without a catalyst.

Alternatively, compound (III) and compound (VI) may be directly reacted using a condensing agent such as DCC, DIC, EDC and the like, or compound (VI) may be treated with a condensing agent to convert the compound to an anhydride and the like, after which it may be reacted with compound (III).

The amount of compound (VI) to be charged is generally 1-50 molar equivalents, preferably 1-10 molar equivalents, relative to compound (III).

The catalyst to be used for the reaction of compound (III) and compound (VI) may be appropriately selected according to the kind of the compound to be reacted.

The amount of catalyst is generally 0.05-100 molar equivalents, preferably 0.1-20 molar equivalents, more preferably 0.1-5 molar equivalent, relative to compound (III).

The solvent to be used for the reaction of compound (III) and compound (VI) is not particularly limited as long as it is a solvent that does not inhibit the reaction. For example, water, ethyl acetate, dichloromethane, chloroform, acetonitrile, toluene and the like can be mentioned. Among these, chloroform and toluene are preferable.

The reaction temperature is generally 0 to 150° C., preferably 0 to 80° C., more preferably 10 to 50° C., and the reaction time is generally 1 hr-48 hr, preferably 2-24 hr.

The cationic lipid (1) obtained by the above-mentioned reaction can be appropriately purified by a general purification method such as extraction purification, recrystallization, adsorption purification, reprecipitation, column chromatography, ion exchange chromatography or the like.

The cationic lipid represented by the formula (2) (hereinafter to be also referred to as cationic lipid (2)) can be produced by the method described in US 2014/0335157 A1.

Phospholipid

Phospholipids can be used as a lipid membrane constituting component of lipid nanoparticles.

Examples of the phospholipid include 1,2-diacyl-sn-glycero-3-phosphocholine (PC), 1,2-diacyl-sn-glycero-3-phosphatidylethanolamine (PE), 1,2-diacyl-sn-glycero-3-phosphatidylserine (PS), 1,2-diacyl-sn-glycero-3-phosphatidylglycerol (PG), 1,2-diacyl-sn-glycero-3-phosphatidic acid (PA), and lyso forms of these, specifically, 1,2-didecanoyl-sn-glycero-3-phosphocholine (DDPC), 1,2-dilauroyl-sn-glycero-3-phosphocholine (DLPC), 1,2-dimyristoyl-sn-glycero-3-phosphocholine (DMPC), 1,2-dipalmitoyl-sn-glycero-3-phosphocholine (DPPC), 1,2-distearoyl-sn-glycero-3-phosphocholine (DSPC), 1,2-dioleoyl-sn-glycero-3-phosphocholine (DOPC), 1,2-dilinoleoyl-sn-glycero-3-phosphocholine (DLoPC), 1,2-dierucoyl-sn-glycero-3-phosphocholine (DEPC), 1-myristoyl-2-palmitoyl-sn-glycero-3-phosphocholine (MPPC), 1-myristoyl-2-stearoyl-sn-glycero-3-phosphocholine (MSPC), 1-palmitoyl-2-myristoyl-sn-glycero-3-phosphocholine (PMPC), 1-palmitoyl-2-stearoyl-sn-glycero-3-phosphocholine (PSPC), 1-palmitoyl-2-oleoyl-sn-glycero-3-phosphocholine (POPC), 1-stearoyl-2-oleoyl-sn-glycero-3-phosphocholine (SOPC), and these PCs appropriately converted to PE, PS, PG, or PA can be used.

Phospholipid to be used in the present invention is preferably PC or PE, further preferably DOPC, POPC, DOPE (1,2-dioleoyl-sn-glycero-3-phosphoethanolamine), or POPE (1-palmitoyl-2-oleoyl-sn-glycero-3-phosphoethanolamine).
Sterol Sterol can be used as a component that regulates fluidity of the lipid membrane of lipid nanoparticles. Examples of the sterol include cholesterol, lanosterol, phytosterol, zymosterol, zymostenol, desmosterol, stigmastanol, dihydrolanosterol, and 7-dehydrocholesterol, preferably cholesterol, lanosterol, and phytosterol, further preferably cholesterol.
PEG Lipid PEG lipids are used as stabilizers that coat the surface of lipid nanoparticles with hydrophilic polyethylene glycol (PEG) and suppress the aggregation of particles, or used to suppress the interaction between biological components and particles when administered to a living body.

The PEG region can have any molecular weight. In some embodiments, the PEG region has a molecular weight of 200-10,000 Da and may be linear or branched.

Examples of the PEG lipid include PEG-phospholipid, PEG-ceramide, PEG-diacylglycerol, and PEG-cholesterol, preferably diacylglycerol PEG with a PEG molecular weight of 1,000-10,000, further preferably dimyristoylglycerol PEG or distearoylglycerol PEG with a PEG molecular weight of 1,000-10,000.
Acidic Buffer and Acidic Buffer Component A buffer or a buffer component having a buffering action in the acidic region can be used. The "acidic buffer component" means a component obtained by substantially removing water from the acidic buffer solution. The level of water contained in the acidic buffer component may be less than about 5 w/v %, less than 4% w/v, less than 3 w/v %, less than 2 w/v %, or less than 1% w/v. Specifically, HCl/KCl buffer, p-toluenesulfonic acid/sodium p-toluenesulfonate buffer, tartaric acid/NaOH buffer, citric acid/NaOH buffer, phthalic acid HK/HCl buffer, glycine/HCl buffer, trans-aconitic acid/NaOH buffer, formic acid/sodium formate buffer, citric acid/sodium citrate buffer, 3,3-dimethylglutaric acid/NaOH buffer, 3,3-dimethylglutaric acid/NaOH/0.1M NaCl buffer, phenylacetic acid/sodium phenylacetate buffer, acetic acid/sodium acetate buffer, succinic acid/NaOH buffer, phthalic acid HK/NaOH buffer, sodium cacodylate/HCl buffer, maleic acid HNa/NaOH buffer, maleic acid/Tris/NaOH buffer, phosphate buffer, $KH_2PO_4$/NaOH buffer, imidazole/HCl buffer, s-collidine (2,4,6-trimethylpyridine)/HCl buffer, triethanolamine HCl/NaOH buffer, sodium 5,5-diethylbarbiturate/HCl buffer, N-methylmorpholine/HCl buffer, sodium pyrophosphate/HCl buffer, MES buffer, malic acid buffer, ADA buffer, PIPES buffer, ACES buffer, HEPES, BES, Bis-Tris buffer, Bis-Tris propane buffer, anhydrous sodium carbonate buffer, glycylglycine buffer, MOPS, MOPSO, and TES can be mentioned.

It is preferably an acid buffer or an acid buffer component having a buffering action at pH 1 to 6, more preferably pH 3 to 6. Examples thereof include tartaric acid/NaOH buffer, citric acid/NaOH buffer, phthalic acid HK/HCl buffer, glycine/HCl buffer, trans-aconitic acid/NaOH buffer, formic acid/sodium formate buffer, citric acid/sodium citrate buffer, 3,3-dimethylglutaric acid/NaOH buffer, 3,3-dimethylglutaric acid/NaOH/0.1M NaCl buffer, phenylacetic acid/sodium phenylacetate buffer, acetic acid/sodium acetate buffer, succinic acid/NaOH buffer, phthalic acid HK/NaOH buffer, sodium cacodylate/HCl buffer, maleic acid HNa/NaOH buffer, maleic acid/Tris/NaOH buffer, phosphate buffer, $KH_2PO_4$/NaOH buffer, MES buffer, malic acid buffer, Bis-Tris buffer, glycylglycine buffer and the like, further preferably malic acid buffer or MES buffer.

The lyophilized composition of the lipid nanoparticles of the present invention preferably has a pH of 1-6, more preferably 3-6, when 100-500 mg of the lyophilized composition is suspended in 1-5 mL of distilled water for injection at 0-30° C.
Preparation Method of Lipid Nanoparticles Examples of the "operation to induce organization" for preparing lipid nanoparticles include methods known per se such as an alcohol dilution method using a micro flow path or vortex, a simple hydration method, sonication, heating, vortex, an ether injecting method, a French press method, a cholic acid method, a $Ca^{2+}$ fusion method, a freeze-thaw method, a reversed-phase evaporation method and the like, preferably an alcohol dilution method using a micro flow path or vortex, further preferably an alcohol dilution method using a micro flow path. Preparation of particles by the alcohol dilution method using a micro flow path can be performed using, for example, NanoAssemblr (Precision NanoSystems). The buffer in the external aqueous phase of the prepared lipid nanoparticles can be replaced by an operation such as ultrafiltration, dialysis, or dilution.
Cryoprotectant As the cryoprotectant that can be used in the present invention, monosaccharide, sugar alcohol, disaccharide, oligosaccharide, polysaccharide, or polymer can be used. Specific examples include glyceraldehyde, erythrose, threose, ribose, lyxose, xylose, arabinose, allose, talose, gulose, glucose, altrose, mannose, galactose, idose, erythrulose, ribulose, psicose, fructose, sorbose, tagatose, erythritol, glycerol, isomaltol, lactitol, maltitol, mannitol, sorbitol, xylitol, inositol, sucrose, lactulose, lactose, maltose, trehalose, cellobiose, kojibiose, nigerose, isomaltose, isotrehalose, neotrehalose, sophorose, laminaribiose, gentiobiose, turanose, maltulose, palatinose, gentiobiose, mannobiose, melibiose, melibiulose, neolactose, galactosucrose, scillabiose, neohesperidose, rutinose, rutinulose, vicianose, xylobiose, primeverose, trehalosamine, maltitol, lactosamine, lactitol, sucralose, raffinose, panose, maltotriose, melezitose, gentianose, stachyose, cyclodextrin, hydroxypropyl-β-cyclodextrin, dextran, polyvinylpyrrolidone, polyethylene glycol and the like, preferably disaccharide, further preferably non-reducing disaccharide, most preferably sucrose.

The concentration of the cryoprotectant is preferably 80-800 mg/mL, more preferably 160-800 mg/mL, as the concentration before lyophilizing. As the weight ratio of the cryoprotectant to the total lipid after lyophilizing, the weight of the cryoprotectant is preferably 10 to 1000 times, more preferably 30 to 1000 times, that of the total lipid.

Lyophilization Step

The lyophilization process can be performed in any suitable container known in the technical field of medicine, such as a glass container (or, for example, glass vial) or a two-chamber container.

The stabilized lipid nanoparticle composition of the present invention containing a cryoprotectant can be introduced into a glass container. The volume of the composition to be added to the container may be 0.1-20 mL, or 1-10 mL.

Any lyophilization process (including those known in the technical field of medicine) can be used. See, for example, Remington's Pharmaceutical Sciences, 18th Ed., Mack Publishing Co., Easton, Penn. (1990).

The lyophilization process may include freezing the lipid nanoparticle composition, stabilized by the cryoprotectant, at a temperature of about −55° C. to about −30° C. The frozen composition may be a dried form of the freeze-dried composition.

In some embodiments, the freezing step may include gradually raising the temperature from room temperature to the final temperature over several minutes. The temperature gradient can be about 1° C./min.

In some embodiments, the drying step can be performed at a pressure of about 0-250 mTorr, or 50-150 mTorr, at a temperature of about −55° C. to about 40° C. The drying step can be continued in a high temperature range up to room temperature for a predetermined period of up to several days. The level of residual water in the solid lyophilized composition may be less than about 5 w/v %, or less than 4% w/v, or less than 3 w/v %, or less than 2 w/v %, or less than 1% w/v.

Rehydration Step

The rehydration step is a step of adding an aqueous solution containing nucleic acid to the lyophilized composition of the present invention to prepare nucleic acid-encapsulating lipid nanoparticles. As for the amount of nucleic acid, an aqueous solution containing nucleic acid such that the ratio of total lipid and nucleic acid contained in the lyophilized composition is, for example, total lipid/nucleic acid=1-1000 nmol/μg, preferably total lipid/nucleic acid=50-500 nmol/μg, is added, and nucleic acid-encapsulating lipid nanoparticles can be prepared by mixing them by pipetting or vortex. In addition, alcohol can be added during rehydration in order to increase the nucleic acid encapsulation rate, and methanol, ethanol, n-butanol and t-butanol, preferably ethanol, can be used as the alcohol. The concentration of alcohol in the aqueous solution containing nucleic acid is 0-50 v/v %, preferably 0-30 v/v %, more preferably 0-25 v/v %. Furthermore, in order to increase the efficiency of nucleic acid encapsulation in the rehydration step, an aqueous solution containing nucleic acid or further alcohol can be added to the lyophilized composition before incubation. The incubation conditions are, for example, 0-100° C. for 0-120 min, preferably 0-95° C. for 0-60 min.

Step of Exchanging External Aqueous Phase with Neutral Buffer

Nucleic acid-encapsulating lipid nanoparticles that can be used as a nucleic acid-introducing agent can be prepared by exchanging the external aqueous phase of the nucleic acid-encapsulating lipid nanoparticles obtained in the rehydration step with a neutral buffer.

Examples of the method of exchanging the external aqueous phase with a neutral buffer include methods using dialysis, ultrafiltration or dilution.

Examples of the neutral buffer include phosphate buffered saline (PBS), Tris-HCl buffer, ADA, PIPES, PIPES sesquisodium, ACES, MOPS, BES, MOPSO, BES, MOPS, TES, HEPES, TAPSO, POPSO, HEPSO and the like. The pH of the neutral buffer is 6-8.

A nucleic acid can be introduced into a cell in vivo and/or in vitro by encapsulating the nucleic acid in the lyophilized composition of the lipid nanoparticles of the present invention and contacting the lipid nanoparticles with the cell. Therefore, the present invention provides a nucleic acid-introducing agent containing the above-mentioned lyophilized composition of the lipid nanoparticles of the present invention.

In addition, the present invention provides a nucleic acid-introducing agent containing nucleic acid-encapsulating lipid nanoparticles prepared by using the lyophilized composition of the lipid nanoparticles of the present invention.

The nucleic acid-introducing agent of the present invention can introduce any nucleic acid into a cell. Examples of the kind of nucleic acid include, but are not limited to, DNA, RNA, chimera nucleic acid of RNA, DNA/RNA hybrid and the like. While any nucleic acid having 1 to 3 chains can be used, it is preferably a single strand or double strand. The nucleic acid may be other type of nucleotide such as N-glycoside of purine or pyrimidine base or other oligomer having a non-nucleotide backbone (e.g., commercially available peptide nucleic acid (PNA) etc.), other oligomer containing a special bond (said oligomer comprising base pairing or a nucleotide having a configuration permitting attachment of base, which are found in DNA and RNA) and the like. Furthermore, it may be a nucleic acid added with known modification, for example, a nucleic acid with a label known in the field, a nucleic acid with a cap, a methylated nucleic acid, one or more natural nucleotides substituted by an analog, a nucleic acid with intramolecular nucleotidyl modification, for example, a nucleic acid with non-charge bond (e.g., methylphosphonate, phosphotriester, phosphoramidate, carbamate and the like), a nucleic acid with a charged bond or sulfur-containing bond (e.g., phosphorothioate, phosphorodithioate and the like), for example, a nucleic acid with a side chain group such as protein (nuclease, nuclease inhibitor, toxin, antibody, signal peptide, poly-L-lysine and the like), sugar (e.g., monosaccharide and the like) and the like, a nucleic acid with an intercalating compound (e.g., acridine, psoralen and the like), a nucleic acid with a chelate compound (e.g., metal, radioactive metal, boron, oxidative metal and the like), a nucleic acid containing an alkylating agent, or a nucleic acid with a modified bond (e.g., α anomer-type nucleic acid and the like).

The type of the DNA that can be used in the present invention is not particularly limited, and can be selected as appropriate according to the purpose of use. For example, plasmid DNA, cDNA, antisense DNA, chromosomal DNA, PAC, BAC, CpG oligosaccharide, and the like can be mentioned. Preferred are plasmid DNA, cDNA and antisense DNA, and more preferred is plasmid DNA. A circular DNA such as plasmid DNA and the like can be digested as appropriate with a restriction enzyme and the like, and also used as a linear DNA.

The type of the RNA that can be used in the present invention is not particularly limited, and can be selected as appropriate according to the purpose of use. For example, siRNA, miRNA, shRNA, antisense RNA, messenger RNA (mRNA), single strand RNA genome, double strand RNA genome, RNA replicon, transfer RNA, ribosomal RNA and the like can be mentioned, with preference given to siRNA, miRNA, shRNA, mRNA, antisense RNA, and RNA replicon.

The nucleic acid used in the present invention is preferably purified by a method generally used by those of ordinary skill in the art.

The nucleic acid-introducing agent of the present invention encapsulating a nucleic acid can be administered in vivo for the purpose of, for example, prevention and/or treatment of diseases. Therefore, the nucleic acid to be used in the present invention is preferably one having a preventive and/or therapeutic activity against a given disease (prophylactic/therapeutic nucleic acid). Examples of such nucleic acid include nucleic acids and the like used for so-called gene therapy.

The nucleic acid-introducing agent of the present invention encapsulating a nucleic acid can be used as a drug delivery system for selectively delivering a nucleic acid and the like into a particular cell, and is useful for, for example, DNA vaccines by introducing antigen gene into dendritic cells, gene therapy drugs for tumor, nucleic acid pharmaceutical products that suppress expression of target genes by utilizing RNA interference, and the like.

The particle size of the lipid nanoparticles encapsulating the nucleic acid is not particularly limited, and is preferably 10 nm-500 nm, more preferably 30 nm-300 nm. The particle size can be measured by using a particle size distribution measuring device such as Zetasizer Nano (Malvern) or the like. The particle size of the lipid nanoparticles can be appropriately adjusted by the method for preparing the lipid membrane structure.

The surface charge (zeta potential) of the lipid nanoparticles encapsulating the nucleic acid is not particularly limited and preferably −15 to +15 mV, more preferably −10 to +10 mV. In conventional transgene, particles electrically charged to have a plus surface potential have been mainly used. This is useful as a method for promoting electrostatic interactions with heparin sulfate on the negatively-charged cell surface to enhance uptake into cells. However, the positive surface charge may suppress, in the cell, release of nucleic acid from the carrier due to the interaction with a nucleic acid to be delivered or protein synthesis due to the interaction between mRNA and a nucleic acid to be delivered. This problem can be solved by adjusting the surface charge to fall within the above-mentioned range. The surface charge can be measured using a zeta potential measuring apparatus such as Zetasizer Nano and the like. The surface charge of the lipid nanoparticles can be adjusted by the composition of the constituent component of the lipid nanoparticles.

The step of contacting the lipid nanoparticles encapsulating the nucleic acid with the cell in vitro is specifically explained below.

The cells are suspended in a suitable medium several days before contact with the lipid nanoparticles, and cultured under appropriate conditions. At the time of contact with the lipid nanoparticles, the cells may or may not be in a proliferative phase.

The culture medium on contact may be a serum-containing medium or a serum-free medium, wherein the serum concentration of the medium is preferably not more than 30 wt %, more preferably not more than 20 wt %, since when the medium contains excess protein such as serum and the like, the contact between the lipid nanoparticles and the cell may be inhibited.

The cell density on contact is not particularly limited, and can be appropriately determined in consideration of the kind of the cell and the like. It is generally within the range of $1 \times 10^4$-$1 \times 10^7$ cells/mL.

A suspension of the aforementioned lipid nanoparticles encapsulating the nucleic acid is added to the thus-prepared cells. The amount of the suspension to be added is not particularly limited, and can be appropriately determined in consideration of the cell number and the like. The concentration of the lipid nanoparticles to be contacted with the cells is not particularly limited as long as the desired introduction of the nucleic acid into the cells can be achieved. The lipid concentration is generally 1-100 nmol/ml, preferably 10-50 nmol/ml, and the concentration of the nucleic acid is generally 0.01-100 μg/ml, preferably 0.1-10 μg/ml.

After the aforementioned suspension is added to cells, the cells are cultured. The temperature, humidity and $CO_2$ concentration during culturing are appropriately determined in consideration of the kind of the cell. When the cell is derived from a mammal, generally, the temperature is about 37° C., humidity is about 95% and $CO_2$ concentration is about 5%. While the culture period can also be appropriately determined in consideration of the conditions such as the kind of the cell and the like, it is generally a range of 0.1-76 hr, preferably a range of 0.2-24 hr, more preferably a range of 0.5-12 hr. When the above-mentioned culture time is too short, the nucleic acid is not sufficiently introduced into the cells, and when the culture time is too long, the cells may become weak.

By the above-mentioned culture, the nucleic acid is introduced into cells. The culture is further continued preferably by exchanging the medium with a fresh medium, or adding a fresh medium to the medium. When the cell is a mammal-derived cell, the fresh medium preferably contains a serum or nutrition factor.

As mentioned above, a nucleic acid can be introduced into cells not only outside the body (in vitro) but also in the body (in vivo) by using lipid nanoparticles encapsulating the nucleic acid. That is, by administration of the lipid nanoparticles encapsulating the nucleic acid to a subject, the lipid nanoparticles reaches and contacts with the target cells, and the nucleic acid encapsulated in the lipid nanoparticles is introduced into the cells in vivo. The subject to which the lipid nanoparticles can be administered is not particularly limited and, for example, vertebrates such as mammals (e.g., human, monkey, mouse, rat, hamster, bovine etc.), birds (e.g., chicken, ostrich etc.), amphibia (e.g., frog etc.), fishes (e.g., zebrafish, rice-fish etc.) and the like, invertebrates such as insects (e.g., silk moth, moth, Drosophila etc.) and the like, plants and the like can be mentioned. The subject of administration of the lipid nanoparticles encapsulating the nucleic acid is preferably human or other mammal.

The kind of the target cell is not particularly limited, and a nucleic acid can be introduced into cells in various tissues (e.g., liver, kidney, pancreas, lung, spleen, heart, blood, muscle, bone, brain, stomach, small intestine, large intestine, skin, adipose tissue, lymph node, tumor, etc.) by using the lipid nanoparticles encapsulating the nucleic acid.

The administration method of the lipid nanoparticles into which a nucleic acid and/or a compound other than nucleic acid is introduced to a target (e.g., vertebrate, invertebrate and the like) is not particularly limited as long as the lipid nanoparticles reaches and contacts with the target cells, and the compound introduced into the lipid nanoparticles can be introduced into the cell, and an administration method known per se (e.g., oral administration, parenteral administration (e.g., intravenous administration, intramuscular administration, topical administration, transdermal administration, subcutaneous administration, intraperitoneal administration, spray etc.) etc.) can be appropriately selected in consideration of the kind of the compound to be introduced, the kind and the site of the target cell and the like. The dose of the lipid nanoparticles is not particularly limited as long as the introduction of the compound into the cells can be achieved, and can be appropriately selected in consideration of the kind of the subject of administration, administration method, the kind of the compound to be introduced, the kind and the site of the target cell and the like.

When the lipid nanoparticles encapsulating the nucleic acid are used as a nucleic acid-introducing agent, they can be formulated according to a conventional method.

When the nucleic acid-introducing agent is provided as a reagent for studies, the lipid nanoparticles encapsulating the nucleic acid may be provided as it is as the nucleic acid-introducing agent of the present invention, or the nucleic acid-introducing agent of the present invention may be provided as a sterile solution or suspension with, for example, water or other physiologically acceptable liquid (e.g., water-soluble solvent (e.g., malic acid buffer etc.), organic solvent (e.g., ethanol, methanol, DMSO, tert-butanol and the like), or a mixture of aqueous solvent and organic solvent etc.). The nucleic acid-introducing agent of the present invention may appropriately contain physiologically acceptable additive (e.g., excipient, vehicle, preservative, stabilizer, binder etc.), which are known per se.

When the nucleic acid-introducing agent is provide as a medicament, the lipid nanoparticles encapsulating the nucleic acid may be used as it is as the nucleic acid-introducing agent of the present invention or the nucleic acid-introducing agent of the present invention may be produced as an oral preparation (for example, tablet, capsule etc.) or a parenteral agent (for example, injection, spray etc.), preferably a parenteral agent (more preferably, injection) by blending with a pharmaceutically acceptable known additives such as carrier, flavor, excipient, vehicle, preservative, stabilizer, binder and the like in a conventionally-admitted unit dosage form required for practicing preparation formulation.

The nucleic acid-introducing agent of the present invention can be formulated into a preparation not only for adults but also for children.

EXAMPLES

The Examples of the present invention are explained in further detail in the following, but the present invention is not limited in any way by the Examples.

The abbreviations used in the present specification each mean the following.

Chol: cholesterol
DMG-PEG2k: 1,2-dimyristoyl-rac-glycerol, methoxypolyethylene glycol (PEG MW 2000)
DSPC: 1,2-distearoyl-sn-glycero-3-phosphocholine
DOPC: 1,2-dioleoyl-sn-glycero-3-phosphocholine
POPC: 1-palmitoyl-2-oleoyl-sn-glycero-3-phosphocholine
DOPE: 1,2-dioleoyl-sn-glycero-3-phosphoethanolamine
POPE: 1-palmitoyl-2-oleoyl-sn-glycero-3-phosphoethanolamine PBS: phosphate buffered saline
MES: 2-morpholinoethanesulfonic acid
DPBS: Dulbecco's phosphate buffered saline Preparation of Lyophilized Compositions of Comparative Examples 1-3

As Comparative Examples, neutral lipid nanoparticles were produced as described below, a cryoprotectant was added, and the mixture was lyophilized to prepare lyophilized compositions.

According to the lipid compositions shown in Table 4, a tert-butanol solution of a lipid and malic acid buffer (pH 3, 20 mM) were mixed by NanoAssemblr (flow rate ratio: buffer/lipid=6/1(v/v), total flow rate: 1 mL/min). This solution was diluted with MES buffer (pH 5.5, 20 mM), and replaced with PBS at pH 7.4 while performing ultrafiltration using Amicon. LNP was concentrated such that the lipid concentration was 200 nmol/100 µL as a theoretical value and recovered, and 100 µL of a sucrose solution was added thereto and mixed. This solution was freeze-dried using a VerTis AdVantage Plus EL-85 freeze-dryer. For lyophilizing, the solution was first frozen at normal pressure at −55° C. for 14 to 21 hr, then the pressure was reduced to 200 mTorr and the temperature was raised by 10° C. The temperature rise program was set to raise the temperature by 10° C. over 3 hr up to −20° C., raise the temperature by 10° C. over 2 hr above −10° C., and allow the sample to stand at said temperature for 1 hr. When the temperature rose to 30° C., the sample was allowed to stand at said temperature for 3 hr, the pressure was returned to normal pressure, and the sample was collected.

Preparation of Lyophilized Compositions of Examples 1-59

According to the lipid compositions shown in Table 5, a tert-butanol solution of a lipid and malic acid buffer (pH 3.0, 20 mM) were mixed by NanoAssemblr (flow rate ratio: buffer/lipid=6/1 (v/v), total flow rate: 1 mL/min). This LNP solution was mixed with an equal amount of a sucrose solution (such that the sucrose final concentration was 80 mg/mL, 160 mg/mL, 320 mg/mL, or 433 mg/mL), and dispensed to a lipid amount of 200 nmol or 600 nmol. This solution was freeze-dried using a VerTis AdVantage Plus EL-85 freeze-dryer. For lyophilizing, the solution was first frozen at normal pressure at −55° C. for 14 to 21 hr, then the pressure was reduced to 200 mTorr and the temperature was raised by 10° C. The temperature rise program was set to raise the temperature by 10° C. over 3 hr up to −20° C., raise the temperature by 10° C. over 2 hr above −10° C., and allow the sample to stand at said temperature for 1 hr. When the temperature rose to 30° C., the sample was allowed to stand at said temperature for 3 hr, the pressure was returned to normal pressure, and the sample was collected.

Preparation of Lyophilized Compositions of Examples 60-70

According to the lipid compositions shown in Table 5, a tert-butanol solution of a lipid and MES buffer (pH 5.0, 20 mM) were mixed by NanoAssemblr (flow rate ratio: buffer/lipid=6/1 (v/v), total flow rate: 1 mL/min). Subsequent operations were performed in the same manner as in Examples 1-59.

Rehydration of Lyophilized Compositions of Comparative Examples 1-3 and Examples 1-59

Under the conditions shown in Tables 4 and 5, an aqueous solution of mRNA, siRNA, or pDNA (RNase-free, containing 12.5% or 25% EtOH) was added to a lyophilized composition at a ratio of total lipid/mRNA (or siRNA or pDNA)=200 nmol/µg, and mixed by pipetting. The mixture was diluted with MES buffer (pH 5.5, 20 mM), and replaced with PBS at pH 7.4 while performing ultrafiltration using Amicon. LNP was concentrated such that the mRNA (or siRNA or pDNA) concentration was 2.5 g/mL as a theoretical value and recovered. Using Ribogreen (registered trade mark) reagent or Picogreen (registered trade mark) reagent, the recovery rate and the encapsulation rate of the nucleic acid were measured. The particle size and zeta potential were measured using Zetasizer.

Measurement of Recovery Rate and Encapsulation Rate (1) A solution (250 µL) is prepared by diluting a nucleic acid-encapsulating LNP solution 2.5-fold with DPBS (theoretical value 1 µg/mL).

(2) For calibration curve, a solution (250 µL each) is prepared by diluting an mRNA solution of known concentration with DPBS to an mRNA concentration of 2000 ng/mL, 1000 ng/mL, 500 ng/mL, 250 ng/mL, 125 ng/mL, or 0 ng/mL.

(3) RiboGreen reagent or PicoGreen reagent is prepared under the conditions shown in the Table below (amount per well). An amount of (calibration curve number+ sample number+1)×2 is prepared for analysis at n=2.

TABLE 3

|  | SOLUTION A (µL) | SOLUTION B (µL) |
|---|---|---|
| DPBS | 47.75 | 49.75 |
| 10% (w/v) TritonX-100 solution (TritonX-100 (Sigma-Aldrich, T8787) was diluted with Milli-Q water) | 2 | 0 |
| RiboGreen or Picogreen reagent | 0.25 | 0.25 |
| Total | 50 | 50 |

(4) 50 µL of the solution prepared in (1) and (2) is added to each well of a black 96 well plate, and then add 50 µL of SOLUTION A or 50 µL of SOLUTION B is added.

(5) The plate is shaded with aluminum foil and incubated for 5 min on a shaker (100-500 rpm).

(6) The fluorescence is measured with a microplate reader (Excitation: 480 nm, Emission: 520 nm).

(7) The recovery rate and the encapsulation rate are calculated by the following calculation formulas.

$$\text{recovery rate } (\%) = \frac{\text{concentration obtained from conditions for SOLUTION } A \text{ addition}}{\text{concentration at } 100\% \text{ recovery}} \times 100$$

$$\text{encapsulation rate } (\%) = \left(1 - \frac{\text{concentration obtained from SOLUTION } B - \text{added sample}}{\text{concentration obtained from conditions for SOLUTION } A \text{ addition}}\right) \times 100$$

Rehydration of Lyophilized Compositions of Examples 60-63

An aqueous solution of mRNA (RNase free) was added to a lyophilized composition at a ratio of total lipid/mRNA=200 nmol/µg, mixed by pipetting, and incubated at 95° C. for 5 min. The mixture was diluted with MES buffer (pH 5.5, 20 mM), and replaced with PBS at pH 7.4 while performing ultrafiltration using Amicon. LNP was concentrated to 2.5 µg/mL as mRNA concentration and recovered. Using Ribogreen reagent, the recovery rate and the encapsulation rate of the nucleic acid were measured. The particle size and zeta potential were measured using Zetasizer.

Rehydration of Lyophilized Compositions of Examples 64 and 65

An aqueous solution of mRNA (RNase free) was added to a lyophilized composition at a ratio of total lipid/mRNA=200 nmol/µg, mixed by pipetting, and incubated at 95° C. for 5 min. Using Ribogreen reagent, the recovery rate and the encapsulation rate of the nucleic acid were measured. The particle size and zeta potential were measured using Zetasizer.

Rehydration of Lyophilized Compositions of Examples 66-70

An aqueous solution of mRNA (RNase free) was added to a lyophilized composition at a ratio of total lipid/mRNA=200 nmol/µg, and mixed by pipetting. The mixture was diluted with MES buffer (pH 5.5, 20 mM), and replaced with PBS at pH 7.4 while performing ultrafiltration using Amicon. LNP was concentrated to 2.5 µg/mL as mRNA concentration and recovered. Using Ribogreen reagent, the recovery rate and the encapsulation rate of the nucleic acid were measured. The particle size and zeta potential were measured using Zetasizer.

The mRNA, siRNA, and pDNA sequences used are shown below.

mRNA: CleanCap (registered trade mark) FLuc mRNA (TriLink)

CleanCap (registered trade mark) EGFP mRNA (TriLink)

CleanCap (registered trade mark) EPO mRNA (5moU) (TriLink)

CleanCap (registered trade mark) OVA mRNA (TriLink)

pDNA: pcDNA3.1-luc (the method described in Biomaterials 2011, 32, 6342.)

siRNA: siFVII (2'-F)
Sense 5'-GGAucAucucAAGucuuAcdT*dT-3'

Antisense 5'-GuAAGAcuuGAGAuGAuccdT*dT-3'
dT: deoxythymidine
*phosphorothioate linkage
Capital letter: native (2'-OH) ribonucleotides
Small letter: 2'-Fluoro-modified nucleotides

TABLE 4

Compositions of lyophilized products of Comparative Examples and rehydration conditions
preparation of neutral lipid nanoparticles, addition of cryoprotectant, lyophilizing, and then rehydration

| sample name | ionic lipid, type and ratio (molar ratio) | sterol, type and ratio (molar ratio) | PEG lipid, type and ratio (molar ratio) | phospholipid, type and ratio (molar ratio) | sucrose concentration (mg/mL) | weight ratio Note 1 | ethanol concentration (v/v %) | type of nucleic acid |
|---|---|---|---|---|---|---|---|---|
| Comparative Example 1 | SS-OP 52.5 | Chol 40 | DMG-PEG2k 1 | DOPC 7.5 | 80 | 90.8 | 0 | mRNA |
| Comparative Example 2 | SS-OP 52.5 | Chol 40 | DMG-PEG2k 1 | DOPC 7.5 | 160 | 181.6 | 0 | mRNA |
| Comparative Example 3 | SS-OP 52.5 | Chol 40 | DMG-PEG2k 1 | DOPC 7.5 | 320 | 363.3 | 0 | mRNA |

Note 1:
weight ratio of sucrose to total lipid

TABLE 5

Compositions of lyophilized products of Examples and rehydration conditions

| sample name | ionic lipid, type and ratio (molar ratio) | sterol, type and ratio (molar ratio) | PEG lipid, type and ratio (molar ratio) | phospholipid, type and ratio (molar ratio) | sucrose concentration (mg/mL) | weight ratio Note 1 | ethanol concentration (v/v %) | type of nucleic acid |
|---|---|---|---|---|---|---|---|---|
| Example 1 | SS-OP 52.5 | Chol 40 | DMG-PEG2k 1 | DOPC 7.5 | 80 | 90.8 | 0 | mRNA |
| Example 2 | SS-OP 52.5 | Chol 40 | DMG-PEG2k 1 | DOPC 7.5 | 160 | 181.6 | 0 | mRNA |
| Example 3 | SS-OP 52.5 | Chol 40 | DMG-PEG2k 1 | DOPC 7.5 | 320 | 363.3 | 0 | mRNA |
| Example 4 | SS-OP 52.5 | Chol 40 | DMG-PEG2k 1 | DOPC 7.5 | 160 | 90.8 | 12.5 | mRNA |
| Example 5 | SS-OP 52.5 | Chol 40 | DMG-PEG2k 1 | DOPC 7.5 | 160 | 181.6 | 25 | mRNA |
| Example 6 | SS-OP 52.5 | Chol 40 | DMG-PEG2k 1 | DOPC 7.5 | 320 | 363.3 | 12.5 | mRNA |
| Example 7 | SS-OP 52.5 | Chol 40 | DMG-PEG2k 1 | DOPC 7.5 | 320 | 363.3 | 25 | mRNA |
| Example 8 | SS-OP 52.5 | Chol 40 | DMG-PEG2k 1 | DOPC 7.5 | 433 | 491.5 | 0 | mRNA |
| Example 9 | SS-OP 52.5 | Chol 40 | DMG-PEG2k 1 | DOPC 7.5 | 320 | 363.3 | 12.5 | pDNA |
| Example 10 | SS-OP 70 | Chol 30 | DMG-PEG2k 1 | none | 320 | 322.7 | 12.5 | siRNA |
| Example 11 | SS-OP 60 | Chol 30 | DMG-PEG2k 1 | DOPE 10 | 320 | 377.7 | 12.5 | mRNA |
| Example 12 | SS-OP 60 | Chol 20 | DMG-PEG2k 1 | DOPE 20 | 320 | 325.1 | 12.5 | mRNA |
| Example 13 | SS-OP 60 | Chol 10 | DMG-PEG2k 1 | DOPE 30 | 320 | 313.4 | 12.5 | mRNA |
| Example 14 | SS-OP 40 | Chol 50 | DMG-PEG2k 1 | DOPE 10 | 320 | 407.3 | 12.5 | mRNA |
| Example 15 | SS-OP 40 | Chol 40 | DMG-PEG2k 1 | DOPE 20 | 320 | 389.1 | 12.5 | mRNA |
| Example 16 | SS-OP 40 | Chol 30 | DMG-PEG2k 1 | DOPE 30 | 320 | 372.5 | 12.5 | mRNA |
| Example 17 | SS-OP 40 | Chol 20 | DMG-PEG2k 1 | DOPE 40 | 320 | 357.2 | 12.5 | mRNA |
| Example 18 | SS-OP 60 | Chol 30 | DMG-PEG2k 1 | POPE 10 | 320 | 338.7 | 12.5 | mRNA |
| Example 19 | SS-OP 60 | Chol 20 | DMG-PEG2k 1 | POPE 20 | 320 | 326.9 | 12.5 | mRNA |
| Example 20 | SS-OP 60 | Chol 10 | DMG-PEG2k 1 | POPE 30 | 320 | 315.9 | 12.5 | mRNA |
| Example 21 | SS-OP 40 | Chol 50 | DMG-PEG2k 1 | POPE 10 | 320 | 408.7 | 12.5 | mRNA |
| Example 22 | SS-OP 40 | Chol 40 | DMG-PEG2k 1 | POPE 20 | 320 | 391.7 | 12.5 | mRNA |
| Example 23 | SS-OP 40 | Chol 30 | DMG-PEG2k 1 | POPE 30 | 320 | 376.0 | 12.5 | mRNA |
| Example 24 | SS-OP 40 | Chol 20 | DMG-PEG2k 1 | POPE 40 | 320 | 361.5 | 12.5 | mRNA |
| Example 25 | SS-OP 58 | Chol 40 | DMG-PEG2k 1 | POPC 2 | 320 | 354.6 | 12.5 | mRNA |

TABLE 5-continued

Compositions of lyophilized products of Examples and rehydration conditions

| sample name | ionic lipid, type and ratio (molar ratio) | sterol, type and ratio (molar ratio) | PEG lipid, type and ratio (molar ratio) | phospholipid, type and ratio (molar ratio) | sucrose concentration (mg/mL) | weight ratio Note 1 | ethanol concentration (v/v %) | type of nucleic acid |
|---|---|---|---|---|---|---|---|---|
| Example 26 | SS-OP 57 | Chol 40 | DMG-PEG2k 1 | POPC 3 | 320 | 356.3 | 12.5 | mRNA |
| Example 27 | SS-OP 56 | Chol 40 | DMG-PEG2k 1 | POPC 4 | 320 | 358.0 | 12.5 | mRNA |
| Example 28 | SS-OP 55 | Chol 40 | DMG-PEG2k 1 | POPC 5 | 320 | 359.7 | 12.5 | mRNA |
| Example 29 | SS-OP 54 | Chol 40 | DMG-PEG2k 1 | POPC 6 | 320 | 361.5 | 12.5 | mRNA |
| Example 30 | SS-OP 53 | Chol 40 | DMG-PEG2k 1 | POPC 7 | 320 | 363.2 | 12.5 | mRNA |
| Example 31 | SS-OP 60 | Chol 40 | DMG-PEG2k 1 | none | 320 | 351.3 | 0 | mRNA |
| Example 32 | SS-OP 60 | Chol 40 | DMG-PEG2k 1 | none | 320 | 351.3 | 25 | mRNA |
| Example 33 | SS-OP 55 | Chol 40 | DMG-PEG2k 1 | DOPC 5 | 320 | 359.2 | 0 | mRNA |
| Example 34 | SS-OP 53 | Chol 40 | DMG-PEG2k 1 | DOPC 7 | 320 | 362.4 | 0 | mRNA |
| Example 35 | SS-OP 55 | Chol 40 | DMG-PEG2k 1 | DOPC 5 | 320 | 359.2 | 25 | mRNA |
| Example 36 | SS-OP 50 | Chol 40 | DMG-PEG2k 1 | DOPC 10 | 320 | 367.4 | 0 | mRNA |
| Example 37 | SS-OP 45 | Chol 40 | DMG-PEG2k 1 | DOPC 15 | 320 | 376.0 | 0 | mRNA |
| Example 38 | SS-OP 60 | Chol 40 | DMG-PEG2k 1 | none | 320 | 351.3 | 12.5 | mRNA |
| Example 39 | SS-OP 55 | Chol 40 | DMG-PEG2k 1 | DOPC 5 | 320 | 359.2 | 12.5 | mRNA |
| Example 40 | DODMA 52.5 | Chol 40 | DMG-PEG2k 1 | DOPC 7.5 | 160 | 275.0 | 0 | pDNA |
| Example 41 | DODMA 52.5 | Chol 40 | DMG-PEG2k 1 | DOPC 7.5 | 160 | 275.0 | 12.5 | pDNA |
| Example 42 | DODMA 52.5 | Chol 40 | DMG-PEG2k 1 | DOPC 7.5 | 160 | 275.0 | 25 | pDNA |
| Example 43 | DODMA 52.5 | Chol 40 | DMG-PEG2k 1 | DOPC 7.5 | 320 | 549.9 | 0 | pDNA |
| Example 44 | DODMA 52.5 | Chol 40 | DMG-PEG2k 1 | DOPC 7.5 | 320 | 549.9 | 12.5 | pDNA |
| Example 45 | DODMA 52.5 | Chol 40 | DMG-PEG2k 1 | DOPC 7.5 | 320 | 549.9 | 25 | pDNA |
| Example 46 | MC3 50 | Chol 38.5 | DMG-PEG2k 1.5 | DSPC 10 | 160 | 264.2 | 0 | pDNA |
| Example 47 | MC3 50 | Chol 38.5 | DMG-PEG2k 1.5 | DSPC 10 | 160 | 264.2 | 12.5 | pDNA |
| Example 48 | MC3 50 | Chol 38.5 | DMG-PEG2k 1.5 | DSPC 10 | 160 | 264.2 | 25 | pDNA |
| Example 49 | MC3 50 | Chol 38.5 | DMG-PEG2k 1.5 | DSPC 10 | 320 | 528.4 | 0 | pDNA |
| Example 50 | MC3 50 | Chol 38.5 | DMG-PEG2k 1.5 | DSPC 10 | 320 | 528.4 | 12.5 | pDNA |
| Example 51 | MC3 50 | Chol 38.5 | DMG-PEG2k 1.5 | DSPC 10 | 320 | 528.4 | 25 | pDNA |
| Example 52 | SS-OP 52.5 | Chol 40 | DMG-PEG2k 1 | DOPC 7.5 | 80 | 90.8 | 12.5 | mRNA |
| Example 53 | SS-OP 58 | Chol 40 | DMG-PEG2k 1 | DOPC 2 | 320 | 354.4 | 12.5 | mRNA |
| Example 54 | SS-OP 57 | Chol 40 | DMG-PEG2k 1 | DOPC 3 | 320 | 356.0 | | |
| Example 55 | SS-OP 56 | Chol 40 | DMG-PEG2k 1 | DOPC 4 | 320 | 357.6 | 0 | mRNA |
| Example 56 | SS-OP 56 | Chol 40 | DMG-PEG2k 1 | DOPC 4 | 320 | 357.6 | 12.5 | mRNA |
| Example 57 | SS-OP 54 | Chol 40 | DMG-PEG2k 1 | DOPC 6 | 320 | 360.8 | 0 | mRNA |
| Example 58 | SS-OP 54 | Chol 40 | DMG-PEG2k 1 | DOPC 6 | 320 | 360.8 | 12.5 | mRNA |
| Example 59 | SS-OP 53 | Chol 40 | DMG-PEG2k 1 | DOPC 7 | 320 | 362.4 | 12.5 | mRNA |
| Example 60 | SS-EP 60 | Chol 30 | DMG-PEG2k 1 | DOPE 10 | 160 | 127.6 | 0 | mRNA |
| Example 61 | SS-EP 60 | Chol 30 | DMG-PEG2k 1 | DOPC 10 | 160 | 127.2 | 0 | mRNA |

TABLE 5-continued

Compositions of lyophilized products of Examples and rehydration conditions

| sample name | ionic lipid, type and ratio (molar ratio) | sterol, type and ratio (molar ratio) | PEG lipid, type and ratio (molar ratio) | phospholipid, type and ratio (molar ratio) | sucrose concentration (mg/mL) | weight ratio Note 1 | ethanol concentration (v/v %) | type of nucleic acid |
|---|---|---|---|---|---|---|---|---|
| Example 62 | SS-EP 52.5 | Chol 40 | DMG-PEG2k 1 | DOPE 7.5 | 160 | 139.6 | 0 | mRNA |
| Example 63 | SS-EP 52.5 | Chol 40 | DMG-PEG2k 1 | DOPC 7.5 | 160 | 139.2 | 0 | mRNA |
| Example 64 (no ultrafiltration after rehydration) | SS-EP 60 | Chol 30 | DMG-PEG2k 1 | DOPE 10 | 160 | 127.6 | 0 | mRNA |
| Example 65 (no ultrafiltration after rehydration) | SS-EP 52.5 | Chol 40 | DMG-PEG2k 1 | DOPE 7.5 | 160 | 139.6 | 0 | mRNA |
| Example 66 | B-2 52.5 | Chol 40 | DMG-PEG2k 1 | DOPC 7.5 | 320 | 521.1 | 0 | mRNA |
| Example 67 | B-2-5 52.5 | Chol 40 | DMG-PEG2k 1 | DOPC 7.5 | 320 | 342.5 | 0 | mRNA |
| Example 68 | TS-P4C2 52.5 | Chol 40 | DMG-PEG2k 1 | DOPC 7.5 | 320 | 327.4 | 0 | mRNA |
| Example 69 | L-P4C2 52.5 | Chol 40 | DMG-PEG2k 1 | DOPC 7.5 | 320 | 448.5 | 0 | mRNA |
| Example 70 | O-P4C2 52.5 | Chol 40 | DMG-PEG2k 1 | DOPC 7.5 | 320 | 447.2 | 0 | mRNA |

Note 1:
weight ratio of sucrose to total lipid

According to the operations, the lyophilized compositions of neutral lipid nanoparticles of Comparative Examples were rehydrated, and the evaluation results of the particle property, and the recovery rate and encapsulation rate of nucleic acid are shown in Table 6.

As shown in the evaluation results in Table 6, in the freeze-dried compositions of neutral lipid nanoparticles, nucleic acid and ionic lipid do not electrostatically interact with each other during rehydration with an aqueous nucleic acid solution. Therefore, the nucleic acid could not be encapsulated in the lipid nanoparticles.

TABLE 6

Property evaluation results of lipid nanoparticles-1

| | Size number average (nm) | PDI | Z potential (mV) | recovery rate (%) | encapsulation rate (%) |
|---|---|---|---|---|---|
| Comparative Example 1 | 164.4 | 0.120 | −4.51 | 106.9 | 2.4 |
| Comparative Example 2 | 119.3 | 0.113 | −2.14 | 88.7 | 0 |
| Comparative Example 3 | 170.7 | 0.130 | −2.88 | 84.4 | 0 |

According to the operations, the lyophilized compositions of acidic lipid nanoparticles in which the concentration of sucrose as a cryoprotectant was changed were rehydrated, and the evaluation results of the particle property, and the recovery rate and encapsulation rate of nucleic acid are shown in Table 7.

As shown in the evaluation results in Table 7, a nucleic acid could be efficiently encapsulated in the acidic lyophilized compositions of Examples 1-3. Furthermore, as shown in Table 7, the encapsulation efficiency of nucleic acid could be enhanced by increasing the concentration of sucrose as a cryoprotectant, and lipid nanoparticles having a small particle distribution in terms of particle property could be prepared.

TABLE 7

Property evaluation results of lipid nanoparticles-2

| | Size number average (nm) | PDI | Z potential (mV) | recovery rate (%) | encapsulation rate (%) |
|---|---|---|---|---|---|
| Example 1 | 144 | 0.253 | −6.4 | 60 | 56 |
| Example 2 | 105.5 | 0.176 | −5.0 | 79.9 | 72.4 |
| Example 3 | 85.25 | 0.109 | −3.05 | 94.5 | 85 |

According to the operations, ethanol concentration at the time of rehydration was changed, and the evaluation results of the particle property, and the recovery rate and encapsulation rate of nucleic acid are shown in Table 8.

As shown in Table 8, the encapsulation efficiency of nucleic acid could be enhanced by the addition of ethanol.

TABLE 8

Property evaluation results of lipid nanoparticles-3

| | Size number average (nm) | PDI | Z potential (mV) | recovery rate (%) | encapsulation rate (%) |
|---|---|---|---|---|---|
| Example 2 | 105.5 | 0.140 | −3.05 | 79.9 | 72.4 |
| Example 4 | 99.49 | 0.135 | −4.50 | 84.8 | 78.2 |
| Example 5 | 99.65 | 0.108 | −4.11 | 86.2 | 80.7 |
| Example 3 | 85.25 | 0.109 | −3.05 | 94.5 | 78.6 |
| Example 6 | 80.29 | 0.108 | −3.96 | 95.5 | 74.7 |
| Example 7 | 78.55 | 0.102 | −4.26 | 96.4 | 82.1 |
| Example 8 | 88.88 | 0.153 | −2.67 | 90.6 | 61.6 |

TABLE 8-continued

Property evaluation results of lipid nanoparticles-3

|  | Size number average (nm) | PDI | Z potential (mV) | recovery rate (%) | encapsulation rate (%) |
|---|---|---|---|---|---|
| Example 1 | 144 | 0.253 | −6.4 | 60 | 56 |
| Example 52 | 106 | 0.27 | −6.45 | 61 | 71 |

According to the operations, the type of nucleic acid at the time of rehydration was changed, and the evaluation results of the particle property, and the recovery rate and encapsulation rate of nucleic acid are shown in Table 9.

As shown in the evaluation results of Table 9, nucleic acid could be efficiently encapsulated irrespective of the type of nucleic acid.

TABLE 9

Property evaluation results of lipid nanoparticles-4
(influence of nucleic acid type)

|  | Size number average (nm) | PDI | Z potential (mV) | recovery rate (%) | encapsulation rate (%) |
|---|---|---|---|---|---|
| Example 9 | 75.67 | 0.098 | −5.29 | 60.1 | 75.6 |
| Example 6 | 80.29 | 0.108 | −3.96 | 95.5 | 74.7 |
| Example 10 | 136.2 | 0.103 | −3.40 | 55.4 | 93.5 |

According to the operations, the type of phospholipid and the lipid composition were changed, and the evaluation results of the particle property, and the recovery rate and encapsulation rate of nucleic acid are shown in Table 10.

As shown in the evaluation results of Table 10, nucleic acid could be efficiently encapsulated irrespective of the type of phospholipid and the lipid composition.

TABLE 10

Property evaluation results of lipid nanoparticles-5
(influence of phospholipid type and lipid composition)

|  | Size number average (nm) | PDI | Z potential (mV) | recovery rate (%) | encapsulation rate (%) |
|---|---|---|---|---|---|
| Example 11 | 95.49 | 0.117 | −4.97 | 88.0 | 72.4 |
| Example 12 | 79.78 | 0.126 | −2.77 | 95.2 | 72.9 |
| Example 13 | 72.87 | 0.142 | −2.10 | 104.6 | 61.4 |
| Example 14 | 86.58 | 0.122 | −5.94 | 94.7 | 70.7 |
| Example 15 | 89.07 | 0.113 | −5.71 | 101.0 | 70.3 |
| Example 16 | 86.39 | 0.132 | −3.65 | 110.5 | 67.8 |
| Example 17 | 88.01 | 0.136 | −2.61 | 117.7 | 63.2 |
| Example 18 | 75 | 0.131 | −5.88 | 87 | 86 |
| Example 19 | 75 | 0.124 | −4.44 | 91 | 85 |
| Example 20 | 68 | 0.128 | −2.41 | 92 | 81 |
| Example 21 | 68 | 0.137 | −6.39 | 87 | 84 |
| Example 22 | 85 | 0.137 | −4.49 | 89 | 82 |
| Example 23 | 81 | 0.140 | −3.39 | 84 | 80 |
| Example 24 | 65 | 0.151 | −3.28 | 91 | 78 |
| Example 25 | 88 | 0.124 | −7.98 | 83 | 82 |
| Example 26 | 82 | 0.123 | −7.53 | 88 | 84 |
| Example 27 | 73 | 0.133 | −6.38 | 88 | 83 |
| Example 28 | 74 | 0.144 | −8.38 | 94 | 84 |
| Example 29 | 69 | 0.137 | −7.35 | 87 | 81 |
| Example 30 | 66 | 0.142 | −6.21 | 89 | 86 |
| Example 31 | 120 | 0.106 | −8.87 | 91 | 91 |
| Example 32 | 112 | 0.101 | −10.6 | 89 | 89 |
| Example 33 | 100 | 0.112 | −4.84 | 84 | 84 |
| Example 34 | 99 | 0.113 | −4.8 | 85 | 85 |

TABLE 10-continued

Property evaluation results of lipid nanoparticles-5
(influence of phospholipid type and lipid composition)

|  | Size number average (nm) | PDI | Z potential (mV) | recovery rate (%) | encapsulation rate (%) |
|---|---|---|---|---|---|
| Example 35 | 102 | 0.104 | −5.95 | 87 | 87 |
| Example 36 | 85 | 0.137 | −2.79 | 79 | 79 |
| Example 37 | 88 | 0.162 | −1.69 | 74 | 74 |
| Example 38 | 106 | 0.122 | −8.41 | 86 | 86 |
| Example 39 | 86 | 0.121 | −6.13 | 84 | 84 |
| Example 7 | 78.55 | 0.102 | −4.26 | 96.4 | 82.1 |
| Example 53 | 109 | 0.092 | −6.49 | 67 | 90 |
| Example 54 | 88 | 0.124 | −6.55 | 73 | 91 |
| Example 55 | 81 | 0.125 | −5.66 | 82 | 87 |
| Example 56 | 95 | 0.103 | −6.52 | 71 | 87 |
| Example 57 | 79 | 0.158 | −5.53 | 75 | 86 |
| Example 58 | 87 | 0.126 | −4.3 | 62 | 92 |
| Example 59 | 97 | 0.123 | −4.09 | 64 | 86 |

According to the operations, the type of ionic lipid was changed, and the evaluation results of the particle property, and the recovery rate and encapsulation rate of nucleic acid are shown in Table 11.

As shown in the evaluation results of Table 11, nucleic acid could be efficiently encapsulated irrespective of the type of ionic lipid.

TABLE 11

Property evaluation results of lipid nanoparticles-6
(influence of ionic lipid type)

|  | Size number average (nm) | PDI | Z potential (mV) | recovery rate (%) | encapsulation rate (%) |
|---|---|---|---|---|---|
| Example 40 | 112.7 | 0.477 | 7.14 | 74.4 | 63.1 |
| Example 41 | 64.51 | 0.516 | 5.72 | 87.0 | 70.9 |
| Example 42 | 249.9 | 0.127 | 4.85 | 46.7 | 62.9 |
| Example 43 | 199.0 | 0.802 | 2.51 | 67.3 | 40.1 |
| Example 44 | 42.28 | 0.900 | 5.51 | 85.4 | 79.1 |
| Example 45 | 184.7 | 38.834 | −9.56 | 46.3 | 51.0 |
| Example 46 | 118.9 | 0.173 | −2.56 | 36.4 | 35.8 |
| Example 47 | 91.57 | 0.143 | −2.71 | 53.9 | 51.5 |
| Example 48 | 104.8 | 0.105 | −1.73 | 66.9 | 65.8 |
| Example 49 | 92.55 | 0.150 | −3.44 | 47.3 | 32.0 |
| Example 50 | 92.05 | 0.107 | −0.755 | 65.1 | 61.6 |
| Example 51 | 115.7 | 0.100 | −1.13 | 67.2 | 70.1 |
| Example 60 | 113.4 | 0.223 | −2.82 | 83.2 | 94.3 |
| Example 61 | 117.9 | 0.235 | 0.67 | 99.1 | 93.7 |
| Example 62 | 128.1 | 0.178 | −10.7 | 77.0 | 94.3 |
| Example 63 | 131.4 | 0.188 | −9.18 | 81.7 | 94.2 |
| Example 64 | 173.8 | 0.259 | −3.60 | 123.8 | 98.0 |
| Example 65 | 159.9 | 0.270 | −11.60 | 124.5 | 96.7 |
| Example 66 | 141.7 | 0.209 | −3.41 | 51.2 | 60.9 |
| Example 67 | 113.2 | 0.186 | −5.75 | 68.6 | 75.4 |
| Example 68 | 82.9 | 0.114 | −6.03 | 87.5 | 90.1 |
| Example 69 | 120.6 | 0.138 | −2.37 | 61.8 | 70.3 |
| Example 70 | 124.1 | 0.152 | −2.84 | 62.7 | 69.2 |

Experimental Example 1

Evaluation of Expression Intensity and Expression Efficiency Per Cell by EGFP-mRNA-Encapsulating LNP An LNP solution encapsulating mRNA expressing EGFP was prepared by the method described in Examples.

Jurkat cells which are human leukemia T cells were seeded in a 1.2 cm well at $5.0 \times 10^4$ cells/1 mL/well 24 hr before transfection. After 24 hr, the prepared LNP solution was added to 1.2 cm well such that 0.1 µg of mRNA was contained, and the cells were cultured for 24 hr in an incubator. The culture medium was exchanged with FACS buffer (PBS containing 0.5% bovine serum albumin (BSA), 0.1% NaN$_3$), measurement was performed by a flow cytometer (NovoCyte; manufactured by ACEA Biosciences), and transgenic cells were analyzed. The proportion of cells expressing EGFP is shown in FIG. 1, and the expression intensity of EGFP is shown in FIG. 2.

As shown in FIGS. 1 and 2, nucleic acid-encapsulating lipid nanoparticles prepared using the lyophilized composition of the present invention could efficiently introduce genes into cells and could further enhance the uniformity and expression intensity of gene transfer into cells by increasing the concentration of sucrose as a cryoprotectant.

Experimental Example 2

Evaluation of Gene Transfer Efficiency Into Cells Using Luc-mRNA Encapsulating Lipid Nanoparticles An LNP solution encapsulating mRNA expressing luciferase was prepared by the method described in Examples.

Jurkat cells which are human leukemia T cells were seeded in a 3.5 cm dish at 2.0×10$^5$ cells/1.9 mL/Dish 24 hr before transfection. After 24 hr, 100 µL of a D-luciferin-containing medium (RPMI1640) was added to each dish at a final concentration of 0.1 mM. The prepared LNP solution was added thereto such that 0.4 µg of mRNA was contained, and the mixture was set in an incubator luminometer KronosDio. The luminescence intensity of luciferase was measured for 2 min every 3 hr. The cumulative luminescence intensity for 24 or 48 hr was calculated from the obtained time change of expression. The results are shown in FIGS. 3-6.

As shown in FIGS. 3-6, genes could be efficiently introduced into cells by using any of DOPC, POPC, DOPE, and POPE as a phospholipid, and the gene transfer efficiency was the highest when POPE was used.

Experimental Example 3

Evaluation of In Vivo mRNA Expression Efficiency in Mouse

An LNP solution encapsulating mRNA expressing erythropoietin was prepared by the method described in Examples.

The prepared LNP solution was diluted with PBS such that the concentration of mRNA was 5 µg/mL. The diluted mRNA-encapsulated LNP was administered into the tail vein of 6-week-old female Balb/c mice at 10 µL per 1 g body weight (0.05 mg/kg as dose of mRNA). The blood (15 µL) was collected from the tail vein of the mice 1, 3, 6, 9, 24 hr after the administration. The collected blood was immediately mixed with 0.3 µL of heparin solution (5000 U/5 mL). Each blood sample was centrifuged under centrifugation conditions (25° C., 2000 g, 20 min), and the supernatant was recovered. The concentration of erythropoietin in the supernatant was measured using Mouse Erythropoietin Quantikine ELISA Kit (manufactured by R&D Systems) and by the method described in the protocol of the Kit. The results are shown in FIG. 7.

As shown in FIG. 7, the activity of the particles produced according to Example 39 was the highest, and in vivo mRNA expression in mouse could be confirmed in all of Example 39, Example 22, and Example 38.

Experimental Example 4

Evaluation of CTL Activity Using Ovalbumin (OVA; Model Antigen)

The antigen-specific cytotoxic T cell activity (CTL activity) was evaluated using OVA as a model antigen.

LNP encapsulating mRNA that expresses OVA was prepared by the method described in the Examples. The prepared LNP solution was diluted with PBS such that the concentration of mRNA was about 1 µg/mL. The diluted mRNA-encapsulated LNP was administered subcutaneously to the back of the neck of 6-week-old C57BL6/J mouse to achieve 0.1 µg of mRNA per mouse. CTL assay was performed 7 days after administration.

CTL assay: Spleens were collected from 6-week-old C57BL6/J mice not sensitized to the antigen, and they were first loosened in RPMI medium with a 5 mL syringe and then tweezers to prepare splenocytes. The splenocytes were passed through a 40 µm cell strainer, and centrifuged (4° C., 500 g, 5 min). The supernatant was removed, the cell aggregates were suspended in an erythrocyte lysis buffer, and centrifuged again after 5 min (4° C., 500 g, 5 min). The supernatant was removed, RPMI medium was added, and the number of cells was counted. The cells were suspended to 1.0×10$^7$ cells/mL and divided into the following two treatment groups.

Target cell group; OVA epitope (SIINFEKL peptide) was added so as to be diluted 400-fold, and the cells were allowed to stand for 30 min and then centrifuged (4° C., 500 g, 5 min). The cells were suspended to 1.0×10$^7$ cells/mL and stained with 5 µM CFSE to prepare a target cell group. Control cell group; The cells were suspended to 1.0×10$^7$ cells/mL and stained with 0.5 µM CFSE to prepare a control cell group. An equal amount of the solution of the target cell group and the solution of the control cell group was mixed, and a cell mixture having a total of 1.0×10$^7$ cells was administered from the tail vein of the mouse immunized as described above. Twenty hours after administration, the spleen of the mouse was collected, and the fluorescence of CFSE was measured with a flow cytometer (NovoCyte; manufactured by ACEA Biosciences). It was confirmed that the measured number of the control cell group showed almost no change throughout the experiment. For each group, the survival ratio of the target cell group to the control cell group was calculated. The 0% of cytotoxic T cell activity was determined from the survival rate of the target cells in PBS-administered mice (non-immune group), and the cytotoxic T cell activity of each sample was calculated from the survival rate of the target cells in immune mice, based on which the OVA specific cytotoxic T cell activity was evaluated.

As shown in FIG. 8, while the activity of the particles prepared as in Example 62 and Example 65 was the highest, it was confirmed that the antigen specific cytotoxic T cell activity can be imparted in all of Example 60, Example 62, Example 64, and Example 65.

Preparation of Lipid Nanoparticles of Comparative Example 4

Particles were prepared according to the following operations by a conventionally-known method that does not undergo a lyophilization step.

At a lipid composition SS-OP/cholesterol/DOPC/DMG-PEG2k=52.5/40/7.5/1.5 (mol) and a ratio of total lipid/mRNA=200 nmol/µg, an ethanol solution of a lipid and malic acid buffer solution of mRNA (pH 3.0, containing 20 mM, 30 mM NaCl) were mixed by NanoAssemblr (flow rate ratio: buffer/lipid=3/1 (v/v), total flow rate: 4 mL/min). This solution was diluted with MES buffer (pH 5.5, 20 mM), and replaced with PBS at pH 7.4 while performing ultrafiltration using Amicon. This solution was diluted with PBS such that mRNA was 10 μg/mL as a theoretical value to give lipid nanoparticles.

Preparation of Lyophilized Composition of Example 71

At a lipid composition SS-OP/cholesterol/DOPC/DMG-PEG2k=52.5/40/7.5/1.5 (mol), an ethanol solution of a lipid and malic acid buffer (pH 3.0, 20 mM) were mixed by NanoAssemblr (flow rate ratio: buffer/lipid=7/1 (v/v), total flow rate: 1 mL/min). This solution was diluted with MES buffer (pH 6, 20 mM), and replaced with MES buffer (pH 6, 20 mM) by ultrafiltration using Amicon. The solution was diluted with MES buffer (pH 6, 20 mM) such that the total lipid was 400 nmol/100 μL, and recovered. An equal amount of sucrose solution (sucrose final concentration 160 mg/mL) was added to this solution and mixed with a vortex mixer. 200 μL thereof was dispensed to a vial, and freeze-dried by an EYELA freeze-dryer. For lyophilizing, the solution was first frozen at normal pressure at −40° C. for 3 hr, then the pressure was reduced to 200 mTorr, and the solution was allowed to stand at −40° C. for 20 hr, for 6 hr every 10° C. at −30 to 0° C., and for 3 hr every 10° C. at 10-30° C. After completion of the program, the pressure was returned to normal pressure and the sample was collected.

Rehydration of Lyophilized Composition of Example 71

200 μL of water containing 2 μg of Luc-mRNA was added to the collected lyophilized sample such that the total lipid/mRNA was 200 nmol/μg, and the mixture was mixed by tapping. It was then incubated at 95° C. for 5 min and neutralized with 200 μL of PBS.

Preparation of Lyophilized Composition of Example 72

At a lipid composition SS-OP/cholesterol/DOPC/DMG-PEG2k=52.5/40/7.5/1.5 (mol), an ethanol solution of a lipid and malic acid buffer (pH 3.0, 20 mM) were mixed by NanoAssemblr (flow rate ratio: buffer/lipid=7/1 (v/v), total flow rate: 16 mL/min). This solution was diluted with MES buffer (pH 6, 20 mM), and replaced with MES buffer (pH 6, 20 mM) by ultrafiltration using Amicon. The solution was diluted with MES buffer (pH 6, 20 mM) such that the total lipid was 400 nmol/100 μL, and recovered. An equal amount of sucrose solution (sucrose final concentration 160 mg/mL) was added to this solution and mixed with a vortex mixer. 200 μL thereof was dispensed to a vial, and freeze-dried by an EYELA freeze-dryer. For lyophilizing, the solution was first frozen at normal pressure at −40° C. for 3 hr, then the pressure was reduced to 200 mTorr, and the solution was allowed to stand at −40° C. for 20 hr, for 6 hr every 10° C. at −30 to 0° C., and for 3 hr every 10° C. at 10-30° C. After completion of the program, the pressure was returned to normal pressure and the sample was collected.

Rehydration of Lyophilized Composition of Example 72

200 μL of water containing 2 μg of hEPO-mRNA was added to the collected lyophilized sample such that the total lipid/mRNA was 200 nmol/μg, and the mixture was mixed by tapping. It was then incubated at 37° C. for 15 min and neutralized with 200 μL of PBS.

The measurement results of the particle property and nucleic acid encapsulation rate in Comparative Example 4, and Examples 71 and 72 are shown in Table 12.

TABLE 12

| | Size number average (nm) | PDI | encapsulation rate (%) |
|---|---|---|---|
| Comparative Example 4 | 78.76 | 0.166 | 96.9 |
| Example 71 | 163.0 | 0.114 | 100 |
| Example 72 | 113.8 | 0.126 | 93.2 |

Experimental Example 5

Evaluation of Gene Expression Activity In Vitro Using HeLa Cells

Using the particles of Comparative Example 4 and Example 71 prepared according to the operations, the intensity of gene expression in cells was evaluated according to the following operation.

HeLa cells were seeded in a 3.5 cm dish at $5.0 \times 10^4$ cells/1.9 mL/Dish 24 hr before transfection. After 24 hr, a medium (RPMI1640) containing D-luciferin was added to each dish by 100 μL such that the final concentration was 0.1 mM. The prepared LNP solution was added thereto such that 0.4 μg of mRNA was contained, and the mixture was set in an incubator luminometer KronosDio. The luminescence intensity of luciferase was measured for 2 min every 1 hr. The results are shown in FIG. 9. Compared with Comparative Example 4, the nanoparticles of Example 71 showed about 34 times higher gene expression activity in vitro.

Experimental Example 6

Evaluation of In Vivo Gene Expression Activity in Mouse

Using the particles of Comparative Example 4 and Example 72 prepared according to the operations, the intensity of gene expression in mouse was evaluated in the same manner as in the method of Experimental Example 3. The results are shown in FIG. 10. Compared with Comparative Example 4, the nanoparticles of Example 72 showed about 1.7 times higher gene expression activity in vivo.

Production Example 1

Synthesis of O-Ph-P4C2

<Acid Anhydridation of Oleic Acid>

Oleic acid (manufactured by NOF CORPORATION) (70.0 g, 248 mmol) was dissolved in chloroform (560 g) at room temperature, and the mixture was cooled to 10-15° C. Thereto was added dropwise a suspension of DCC (manufactured by Osaka Synthetic Chemical Laboratories, Inc.) (25.1 g, 121 mmol) dissolved in chloroform (140 g), and the mixture was reacted at 10-25° C. for 2 hr. The reaction solution was filtered, and the filtrate was concentrated by an evaporator. The obtained concentrate was re-dissolved in hexane (210 g), and insoluble material was removed by filtration. The obtained filtrate was concentrated by an evaporator to give oleic anhydride (64.2 g).

<Synthesis of 4-Oleoyloxyphenylacetic Acid>

Oleic anhydride (43.1 g, 78.9 mmol) and 4-hydroxyphenylacetic acid (manufactured by Tokyo Chemical Industry Co., Ltd.) (6.00 g, 39.4 mmol) were dissolved in chloroform (647 g). Thereto was added DMAP (manufactured by KOEI CHEMICAL CO., LTD.) (1.93 g, 15.8 mmol) and the mixture was reacted at room temperature for 9 hr. The reaction solution was washed twice with 10% aqueous acetic acid solution (216 g) and twice with ion exchange water (216 g). Magnesium sulfate (manufactured by KANTO CHEMICAL CO., INC.) (12.9 g) was added to the organic layer, and the mixture was stirred for 30 min. Magnesium sulfate was filtered off, and the filtrate was concentrated by an evaporator. The concentrate was re-dissolved in hexane (284 g), the insoluble material was filtered off, and the filtrate was extracted 6 times with acetonitrile (168 g). The acetonitrile layer was recovered and concentrated by an evaporator to give a crude product (18.1 g). The obtained crude product (14.5 g) was subjected to column purification to give 4-oleoyloxyphenylacetic acid (3.66 g).

<Synthesis of O-Ph-P4C2>

Bis{2-[4-(2-hydroxyethyl)piperidyl]ethyl}disulfide (di-4PE form) (0.350 g, 0.929 mmol) synthesized by the method described in US 2014/0335157 A1, 4-oleoyloxyphenylacetic acid (0.813 g, 1.95 mmol), and DMAP (0.0454 g, 0.372 mmol) were dissolved in chloroform (10.5 g) at room temperature. Thereto was added EDC (0.534 g, 2.79 mmol), and the mixture was reacted at 30-35° C. for 4 hr. The reaction solution was washed twice with 20% brine (7.00 g) and dehydrated using magnesium sulfate (0.350 g). Magnesium sulfate was filtered off, and the filtrate was concentrated in an evaporator to give a crude product (1.10 g). The obtained crude product was subjected to column purification to give O-Ph-P4C2 (0.722 g).

Production Example 2

Synthesis of E-Ph-P4C2

<Acid Anhydridation of Succinic Acid D-α-Tocopherol>

Succinic acid D-α-tocopherol (manufactured by SIGMA-ALDRICH) (70.0 g, 132 mmol) was dissolved in chloroform (560 g) at room temperature, and the mixture was cooled to 10-15° C. Thereto was added dropwise a suspension of DCC (manufactured by Osaka Synthetic Chemical Laboratories, Inc.) (13.7 g, 66 mmol) dissolved in chloroform (140 g), and the mixture was reacted at 10-25° C. for 2 hr. The reaction solution was filtered, and the filtrate was concentrated by an evaporator. The obtained concentrate was re-dissolved in hexane (210 g), and insoluble material was removed by filtration. The obtained filtrate was concentrated by an evaporator to give succinic anhydride D-α-tocopherol (64.2 g).

<Synthesis of 4-(D-α-Tocopherol Hemisuccinyl)Phenylacetic Acid>

Succinic anhydride D-α-tocopherol (43.1 g, 41.3 mmol) and 4-hydroxyphenylacetic acid (manufactured by Tokyo Chemical Industry Co., Ltd.) (3.13 g, 20.6 mmol) were dissolved in chloroform (647 g). Thereto was added DMAP (manufactured by KOEI CHEMICAL CO., LTD.) (1.01 g, 8.26 mmol) and the mixture was reacted at room temperature for 9 hr. The reaction solution was washed twice with 10% aqueous acetic acid solution (216 g) and twice with ion exchange water (216 g). Magnesium sulfate (manufactured by KANTO CHEMICAL CO., INC.) (12.9 g) was added to the organic layer, and the mixture was stirred for 30 min. Magnesium sulfate was filtered off, and the filtrate was concentrated by an evaporator. The concentrate was re-dissolved in hexane (284 g), the insoluble material was filtered off, and the filtrate was extracted 6 times with acetonitrile (168 g). The acetonitrile layer was recovered and concentrated by an evaporator to give a crude product (17.0 g). The obtained crude product (13.6 g) subjected to column purification to give 4-(D-α-tocopherol hemisuccinyl)phenylacetic acid (3.44 g).

<Synthesis of E-Ph-P4C2> di-4PE form (0.350 g, 0.929 mmol), 4-(D-α-tocopherol hemisuccinyl)phenylacetic acid (1.04 g, 1.95 mmol), and DMAP (0.0454 g, 0.372 mmol) were dissolved in chloroform (10.5 g) at room temperature. Thereto was added EDC (0.534 g, 2.79 mmol), and the mixture was reacted at 30-35° C. for 4 hr. The reaction solution was washed twice with 20% brine (7.00 g) and dehydrated using magnesium sulfate (0.350 g). Magnesium sulfate was filtered off, and the filtrate was concentrated in an evaporator to give a crude product (1.31 g). The obtained crude product was subjected to column purification to give E-Ph-P4C2 (0.860 g).

INDUSTRIAL APPLICABILITY

According to the present invention, since nucleic acid can be intracellularly introduced with high efficiency, the present invention is useful for nucleic acid medicaments, gene therapy and biochemical experiments.

This application is based on patent application No. 2019-176253 filed in Japan, the contents of which are encompassed in full herein.

The invention claimed is:

1. A lyophilized composition of lipid nanoparticles not comprising a nucleic acid but comprising an ionic lipid, a sterol, a PEG lipid, an acidic buffer component that shows a buffering action at pH 1-6, and a cryoprotectant, wherein a weight ratio of the cryoprotectant and a total lipid is 10:1-1000:1, and the ionic lipid is a compound represented by the formula (1);

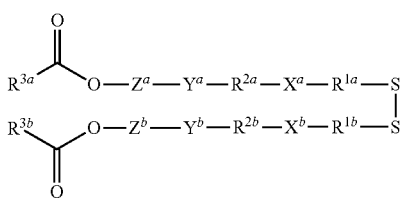

(1)

wherein
- $R^{1a}$ and $R^{1b}$ are each independently an alkylene group having 1-6 carbon atoms,
- $X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups,
- $R^{2a}$ and $R^{2b}$ are each independently an alkylene group or an oxydialkylene group each having not more than 8 carbon atoms,
- $Y^a$ and $Y^b$ are each independently an ester bond, an amide bond, a carbamate bond, an ether bond or a urea bond,
- $Z^a$ and $Z^b$ are each independently a divalent group derived from an aromatic compound having 3-16 carbon atoms and at least one aromatic ring, and optionally having a hetero atom, and
- $R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms.

2. The lyophilized composition according to claim 1, further comprising a phospholipid.

3. The lyophilized composition according to claim 1, wherein the weight ratio of the cryoprotectant and the total lipid is 30:1-1000:1.

4. The lyophilized composition according to claim 1, wherein a concentration of the cryoprotectant in the composition before lyophilizing is 80-800 mg/mL.

5. The lyophilized composition according to claim 1, wherein a concentration of the cryoprotectant in the composition before lyophilizing is 160-800 mg/mL.

6. The lyophilized composition according to claim 1, wherein the cryoprotectant is disaccharide.

7. The lyophilized composition according to claim 1, wherein the cryoprotectant is sucrose.

8. A method for producing a nucleic acid-encapsulating lipid nanoparticle, comprising the following steps:
   a) a step of mixing an alcohol solution containing an ionic lipid, a sterol, and a PEG lipid, and an acidic buffer showing a buffering action at pH 1-6 to prepare a suspension of lipid nanoparticles not containing a nucleic acid, wherein the ionic lipid is a compound represented by the formula (1):

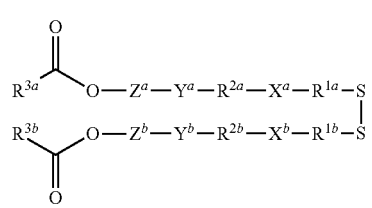

(1)

wherein
- $R^{1a}$ and $R^{1b}$ are each independently an alkylene group having 1-6 carbon atoms,
- $X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups,
- $R^{2a}$ and $R^{2b}$ are each independently an alkylene group or an oxydialkylene group each having not more than 8 carbon atoms,
- $Y^a$ and $Y^b$ are each independently an ester bond, an amide bond, a carbamate bond, an ether bond or a urea bond,
- $Z^a$ and $Z^b$ are each independently a divalent group derived from an aromatic compound having 3-16 carbon atoms and at least one aromatic ring, and optionally having a hetero atom, and
- $R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms, b) a step of mixing the suspension of the lipid nanoparticles not containing a nucleic acid and a cryoprotectant to give a mixture with pH 1-6 and containing the cryoprotectant at 80-800 mg/mL, wherein a weight ratio of the cryoprotectant and a total lipid is 10:1-1000:1, c) a step of lyophilizing the mixture obtained in step b to give a lyophilized composition, d) a step of mixing the lyophilized composition and an aqueous solution containing a nucleic acid and optionally containing alcohol at 0-25 v/v %, and optionally incubating the mixture at 0-95° C. for 0-60 min to give nucleic acid-encapsulating lipid nanoparticles, and e) a step of exchanging an external aqueous phase of the obtained nucleic acid-encapsulating lipid nanoparticles with a neutral buffer by dialysis, ultrafiltration, or dilution.

9. The method according to claim 8, wherein the step a further comprises a step of exchanging the external aqueous phase with another acidic buffer showing a buffering action at pH 1-6, by dialysis, ultrafiltration, or dilution, after preparing the suspension of lipid nanoparticles.

10. The method according to claim 8, wherein the alcohol solution further comprises a phospholipid in step a.

11. The method according to claim 8, wherein a concentration of the cryoprotectant in the mixture in step b is 160-800 mg/mL.

12. The method according to claim 8, wherein the cryoprotectant is disaccharide.

13. The method according to claim 8, wherein the cryoprotectant is sucrose.

14. A method for producing a lyophilized composition of lipid nanoparticles, comprising a step of lyophilizing a composition of lipid nanoparticles not containing a nucleic acid but containing an ionic lipid, a sterol, a PEG lipid, an acidic buffer that shows a buffering action at pH 1-6, and a cryoprotectant at 80-800 mg/mL, wherein a weight ratio of the cryoprotectant and a total lipid is 10:1-1000:1, and the ionic lipid is a compound represented by the formula (1):

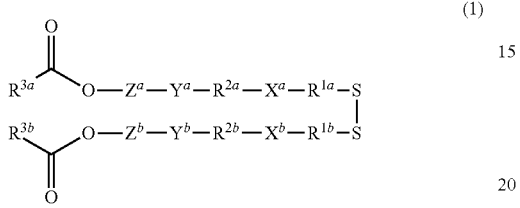

wherein
$R^{1a}$ and $R^{1b}$ are each independently an alkylene group having 1-6 carbon atoms,
$X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups,
$R^{2a}$ and $R^{2b}$ are each independently an alkylene group or an oxydialkylene group each having not more than 8 carbon atoms,
$Y^a$ and $Y^b$ are each independently an ester bond, an amide bond, a carbamate bond, an ether bond or a urea bond,
$Z^a$ and $Z^b$ are each independently a divalent group derived from an aromatic compound having 3-16 carbon atoms and at least one aromatic ring, and optionally having a hetero atom, and
$R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms.

15. The method according to claim 14, wherein the composition of lipid nanoparticles further comprises a phospholipid.

16. The method according to claim 14, wherein a concentration of the cryoprotectant in the composition before lyophilizing is 160-800 mg/mL.

17. The method according to claim 14, wherein the cryoprotectant is disaccharide.

18. The method according to claim 14, wherein the cryoprotectant is sucrose.

19. A nucleic acid-introducing agent comprising the lyophilized composition according to claim 1.

20. A method for introducing a nucleic acid into a cell in vitro, comprising bringing the nucleic acid-introducing agent according to claim 19 encapsulating the nucleic acid into contact with the cell.

21. A method for introducing a nucleic acid into a target cell, comprising administering the nucleic acid-introducing agent according to claim 19 encapsulating the nucleic acid to a living organism to allow for delivery of the nucleic acid to the cell.

22. A method for introducing a nucleic acid into a cell, comprising the following steps:
a) a step of mixing an alcohol solution containing an ionic lipid, a sterol, and a PEG lipid, and an acidic buffer showing a buffering action at pH 1-6 to prepare a suspension of lipid nanoparticles not containing a nucleic acid, wherein the ionic lipid is a compound represented by the formula (1):

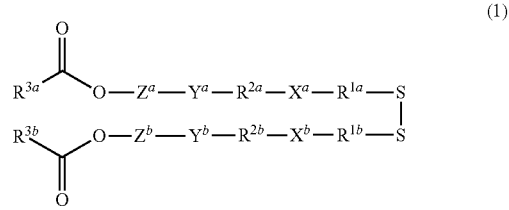

wherein
$R^{1a}$ and $R^{1b}$ are each independently an alkylene group having 1-6 carbon atoms,
$X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups,
$R^{2a}$ and $R^{2b}$ are each independently an alkylene group or an oxydialkylene group each having not more than 8 carbon atoms,
$Y^a$ and $Y^b$ are each independently an ester bond, an amide bond, a carbamate bond, an ether bond or a urea bond,
$Z^a$ and $Z^b$ are each independently a divalent group derived from an aromatic compound having 3-16 carbon atoms and at least one aromatic ring, and optionally having a hetero atom, and
$R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms,
b) a step of mixing the suspension of the lipid nanoparticles not containing a nucleic acid and a cryoprotectant to give a mixture with pH 1-6 and containing the cryoprotectant at 80-800 mg/mL, wherein a weight ratio of the cryoprotectant and a total lipid is 10:1-1000:1,
c) a step of lyophilizing the mixture obtained in step b to give a lyophilized composition,
d) a step of mixing the lyophilized composition and an aqueous solution containing the nucleic acid and optionally containing alcohol at 0-25 v/v %, and optionally incubating the mixture at 0-95° C. for 0-60 min to give nucleic acid-encapsulating lipid nanoparticles,
e) a step of exchanging an external aqueous phase of the obtained nucleic acid-encapsulating lipid nanoparticles with a neutral buffer by dialysis, ultrafiltration, or dilution, and
f) a step of bringing the obtained nucleic acid-encapsulating lipid nanoparticles into contact with the cell in vitro.

23. The method according to claim 22, wherein the step a further comprises a step of exchanging the external aqueous phase with another acidic buffer showing a buffering action at pH 1-6, by dialysis, ultrafiltration, or dilution, after preparing the suspension of lipid nanoparticles.

24. A method for introducing a nucleic acid into a target cell, comprising the following steps:

a) a step of mixing an alcohol solution containing an ionic lipid, a sterol, and a PEG lipid, and an acidic buffer showing a buffering action at pH 1-6 to prepare a suspension of lipid nanoparticles not containing a nucleic acid, wherein the ionic lipid is a compound represented by the formula (1):

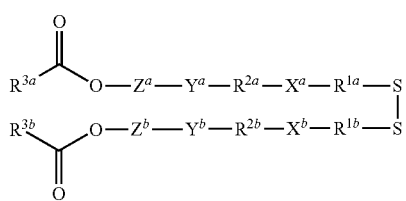

wherein $R^{1a}$ and $R^{1b}$ are each independently an alkylene group having 1-6 carbon atoms, $X^a$ and $X^b$ are each independently a non-cyclic alkyl tertiary amino group having 1-6 carbon atoms and one tertiary amino group, or a cyclic alkylene tertiary amino group having 2-5 carbon atoms and 1-2 tertiary amino groups, $R^{2a}$ and $R^{2b}$ are each independently an alkylene group or an oxydialkylene group each having not more than 8 carbon atoms, $Y^a$ and $Y^b$ are each independently an ester bond, an amide bond, a carbamate bond, an ether bond or a urea bond, $Z^a$ and $Z^b$ are each independently a divalent group derived from an aromatic compound having 3-16 carbon atoms and at least one aromatic ring, and optionally having a hetero atom, and $R^{3a}$ and $R^{3b}$ are each independently a residue derived from a reaction product of a liposoluble vitamin having a hydroxyl group, and succinic anhydride or glutaric anhydride, or a residue derived from a reaction product of a sterol derivative having a hydroxyl group, and succinic anhydride or glutaric anhydride, or an aliphatic hydrocarbon group having 12-22 carbon atoms, b) a step of mixing the suspension of the lipid nanoparticles not containing a nucleic acid and a cryoprotectant to give a mixture with pH 1-6 and containing the cryoprotectant at 80-800 mg/mL, wherein a weight ratio of the cryoprotectant and a total lipid is 10:1-1000:1, c) a step of lyophilizing the mixture obtained in step b to give a lyophilized composition, d) a step of mixing the lyophilized composition and an aqueous solution containing the nucleic acid and optionally containing alcohol at 0-25 v/v %, and optionally incubating the mixture at 0-95° C. for 0-60 min to give nucleic acid-encapsulating lipid nanoparticles, e) a step of exchanging an external aqueous phase of the obtained nucleic acid-encapsulating lipid nanoparticles with a neutral buffer by dialysis, ultrafiltration, or dilution, and f) a step of administering the obtained nucleic acid-encapsulating lipid nanoparticles to a living organism to allow for delivery of the nucleic acid to the target cell.

25. The method according to claim 24, wherein the step a further comprises a step of exchanging the external aqueous phase with another acidic buffer showing a buffering action at pH 1-6, by dialysis, ultrafiltration, or dilution, after preparing the suspension of lipid nanoparticles.

* * * * *